COMMON CONTROL FOR REMOTE TELEPHONE SWITCH UNITS

Filed Jan. 21, 1963

INVENTORS
FRANK S. VIGLIANTE
ROBERT D. WILLIAMS
ELDON L. SELEY
BY R. C. Winter
ATTORNEY Aug. 23, 1966 F. S. VIGLIANTE ET AL 3,268,669

COMMON CONTROL FOR REMOTE TELEPHONE SWITCH UNITS

Filed Jan. 21, 1963 16 Sheets-Sheet 3

Aug. 23, 1966 F. S. VIGLIANTE ET AL 3,268,669

COMMON CONTROL FOR REMOTE TELEPHONE SWITCH UNITS

Filed Jan. 21, 1963 16 Sheets-Sheet 4

Aug. 23, 1966 F. S. VIGLIANTE ET AL 3,268,669

COMMON CONTROL FOR REMOTE TELEPHONE SWITCH UNITS

Filed Jan. 21, 1963 16 Sheets-Sheet 7

COMMON CONTROL FOR REMOTE TELEPHONE SWITCH UNITS

Filed Jan. 21, 1963

United States Patent Office 3,268,669 Patented August 23, 1966

3,268,669

COMMON CONTROL FOR REMOTE TELEPHONE SWITCH UNITS

Frank S. Vigliante, Piscataway Township, Middlesex County, Robert D. Williams, Middletown, and Eldon L. Seley, New Shrewsbury, N.J., assignors to Bell Telephone Laboratories, Incorporated, New York, N.Y., a corporation of New York Filed Jan. 21, 1963, Ser. No. 252,797
37 Claims. (Cl. 179—27)

This invention relates to control facilities for a telephone system, and more particularly to the common control of a plurality of private branch exchanges from a single unit remote from the PBX's, the operation of which is directed by a stored program.

From the point of view of the user, telephone service is acceptable if call connections are completed in a matter of seconds. Thus the mere substitution of high speed electronic devices for the slower electromechanical counterparts employed in contemporary systems would afford little advantage. The picture changes dramatically, however, when control operations for a number of isolated telephone exchanges are performed in common at a single location. In the latter case, with a large number of calls being processed concurrently, the high speed capabilities of a relatively small number of devices at the common control facility are realized.

Further advantages may be derived from such a system organization, particularly with a group of isolated PBX's, by utilizing stored program techniques in the common control unit. Such techniques envision the implementation of a predetermined series of actions in response to a set of instructions contained in a memory or program store. Such a set of instructions may be modified at will, thus providing flexibility at a common point to meet the individual needs of the considerable number of PBX customers it can serve.

It is a general object of this invention to provide an improved telephone system.

It is another object of this invention to improve the operation of the common control facility in a telephone system serving a plurality of private branch exchanges.

It is a further object of this invention to utilize stored program techniques to optimum advantage in the common control facility in the processing of all calls through the multiple PBX system.

These and other objects of this invention are attained in one specific illustrative embodiment comprising a telephone system having a plurality of isolated PBX switching units, the control functions of which are performed by a common control facility remote from the PBX's. A system of this type is disclosed, for example, by R. C. Gebhardt et al. in patent application Serial No. 195,199, filed May 16, 1962, now Patent 3,225,144, issued December 21, 1965. Data is transmitted to the control unit from the various PBX's for processing, after which operating instructions are returned to the PBX's for implementation. These instructions direct switching operations which serve to interconnect pairs of lines in communication on a time division basis.

The control facility of the instant embodiment is in two section operating in different time cycles. The input-output section is in direct contact with all of the PBX switch units, and may receive messages from each unit simultaneously. These messages, representing line conditions and called line designations, are stored in serial from in a temporary memory until requested by the call processing section. The input-output section also receives messages from the call processing section for subsequent dissemination throughout the system. Transfers of information between the two sections of the control unit are in parallel form.

The principal functions of the call processing section are to establish and supervise calls through the system. For these purposes it records the status of each call and maintains this status current in accordance with the actions of the calling and called parties and the condition of equipment involved. The call status is maintained in a temporary memory, with updating accomplished under control exercised by a stored program. The program directs the correlation of new messages obtained from the input-output section with current status records and the dissemination of orders and information for subsequent system action.

It is a feature of this invention that in a telephone system, a plurality of private branch exchange switching units be controlled in common by a facility remote from the PBX units consisting of a call processing section directed by a stored program and an input-output section which exchanges data with the PBX units and with the call processing section pursuant to the establishment and supervision of all calls through the system.

It is another feature of this invention that the input-output section of the control unit receive data directly from each PBX switch unit as transmitted, scan the received data, and store it in a distinct memory storage area allocated to each PBX switch unit.

More particularly, it is a feature of this invention that the received data comprising line condition information and called line designations be routed to different portions of the allocated storage area, the called line designation receivers being scanned on a time division basis and their content routed selectively to the input-output section memory.

It is another feature of the invention that the input-output section may alert the call processing section as to the type of call being placed prior to receipt of a complete called line designation and in turn receive from the call processing section for subsequent outpulsing such a complete called line designation.

It is a further feature of this invention that the scanning routine in the input-output section be interrupted at the discretion of the call processing section to permit an exchange of information therebetween without disturbing the activity of the input-output section with respect to the PBX switch units.

It is still another feature of this invention that the call processing section comprise a temporary call status memory, a semipermanent line information memory and a semipermanent program store, all of which are controlled by the stored program to process a single call at a time.

More particularly, it is a feature of this invention that the status of each call, as recorded in the call status store, be observed in sequence, that an indication of the progress of each call contained in this call status record initiate the addressing of the program store to the proper program sequence for performing the system actions required by the particular call status.

It is a feature in accordance with one aspect of this invention that the call processing section include an active call status store containing the current call status records, a standby call status store containing information required in the processing of certain types of calls, and duplicate program stores each connected to a corresponding one of the call status stores and only active if the corresponding call status store is active.

It is a further feature in accordance with this aspect of the invention that the content of the active and standby call status stores be interchanged under control of either of the duplicate program stores.

A complete understanding of this invention and of the above-noted and other features thereof may be gained from consideration of the following detailed description and the accompanying drawing, in which:

FIGS. 1 and 2 are block diagram representations of a private branch exchange system in accordance with this invention;

FIGS. 3 through 13 contain a more detailed representation of the system's control facility in accordance with this invention;

INDEX

| | Column |
|---|---|
| I—SWITCH UNITS **10**–*n* | 3 |
| II—CONTROL UNIT **20** | 5 |
| A—Input-Output Section **21** | 5 |
| 1—Input-Output Section Storage | 5 |
| 2—Data Transfer Equipment | 6 |
| 3—Digit Transfer Equipment | 7 |
| 4—Call Connection | 9 |
| 5—Data Control **203** | 9 |
| 6—Digit Control **210** | 14 |
| a—Components | 15 |
| b—Digit Control Operation | 17 |
| 7—Sender Control **211** | 22 |
| B—Call Processing Section **22** | 24 |
| 1—Call Status Control **222** | 25 |
| 2—Program Control **220** | 28 |
| a—Components | 29 |
| b—Processing Commands | 32 |
| 3—Line Information Control **223** | 35 |
| 4—Processing a Call | 35 |

*I—Switch units 10–n (FIG. 1)*

Figure 1:
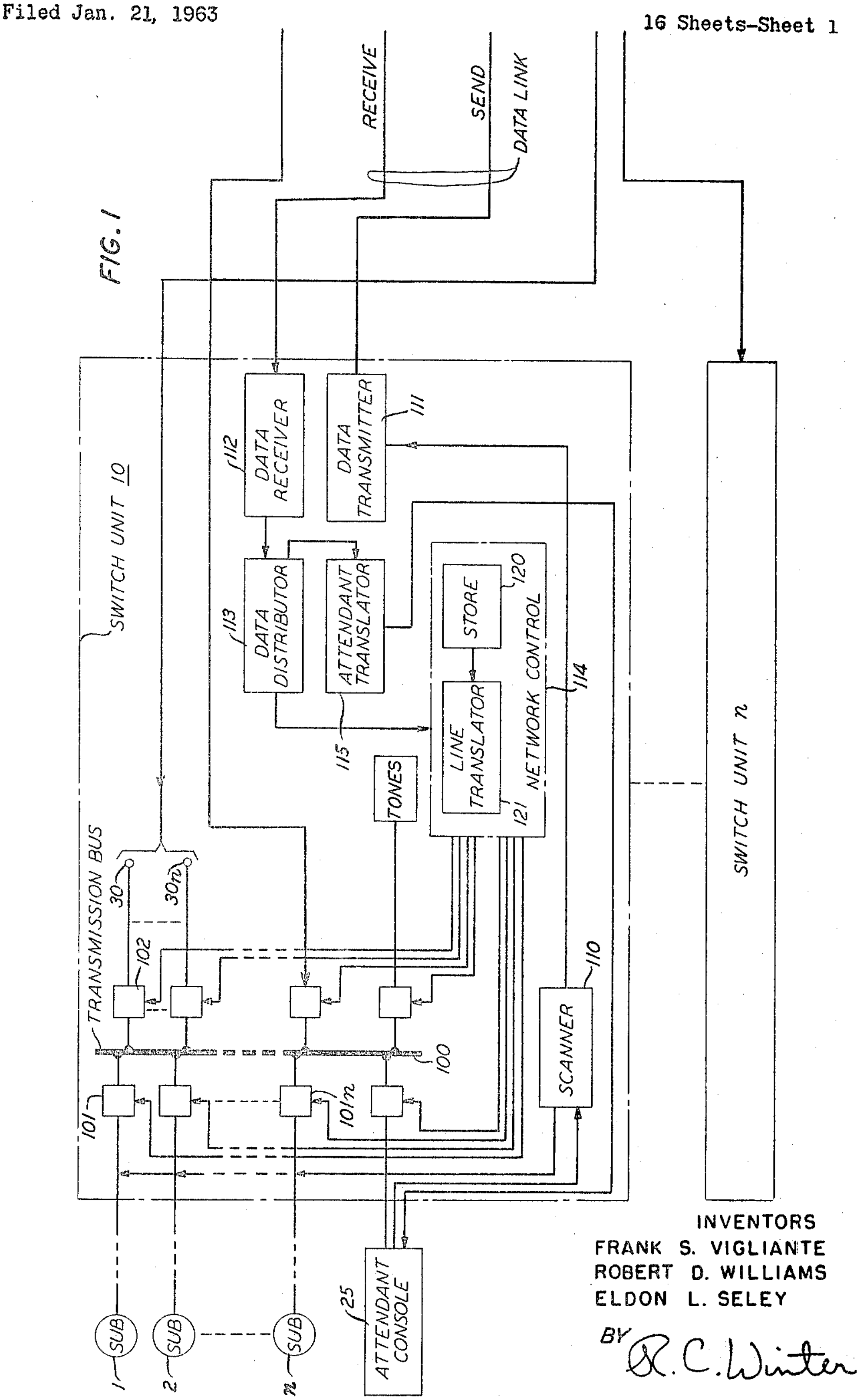

Turning now to the drawing, the principal characteristics of one switch unit and the control unit for the electronic PBX system are illustrated in FIG. 1. The switch unit 10 is essentially as described in detail in the aforementioned R. C. Gebhardt et al. patent, but for purposes of understanding the overall system operation, a brief description of the switch unit operation is provided herewith.

Time division switching is based on the principle that periodic samples of an information signal are sufficient to completely define the signal and that such samples, gleaned from a multitude of signals, may be transmitted in a regular sequence over a time-shared common path. Thus a plurality of terminal stations such as telephones 1–*n* is connected to a common transmission bus 100 through corresponding line gates 101–101*n*, which gates are sampled on a selective basis for a predetermined time interval in a recurrent cycle of time intervals. If a pair of gates is closed simultaneously for the prescribed time interval, a sample of the information available at each terminal will be transferred to the opposite terminal via the common transmission bus 100 and the low pass filters included in the line circuits corresponding to the active gates. Thus a bilateral connection is established which, although physically connected only a small fraction of the time, appears to be continuously connected because of the smoothing action of the line filters.

It is characteristic of the contemporary PBX operations that they are self-contained, i.e., the transmission circuits, switching network and all control circuits, are located together on the customer's premises. The instant system, as indicated in the aforementioned Gebhardt et al. patent, extends the common control concept by having a centrally located control unit 20 which directs the call processing in all of the remotely located switch units 10 via corresponding data links. More specifically, the switch unit 10 informs the control unit 20 of all changes in the supervisory status of telephone lines, trunks and attendant console keys, e.g., whether they are idle (on-hook) or busy (off-hook). The control unit 20 then performs all of the decision-making tasks of call processing.

The operation of the switch unit 10 may be understood more fully upon consideration of a typical intra-PBX call. Assume telephone 1, FIG. 1, goes off-hook. This change of status is recognized by the scanner 110 which in turn formulates a message containing the corresponding line number and the new supervisory state. This information is transmitted to the control unit 20, FIG. 2, via data transmitter 111 and the send leg of the data link.

The control unit 20, recognizing that there is no current call established which involves this particular line, determines that the off-hook indication is a request for services and proceeds to set up a dialing connection. For this purpose a message is sent to the switch unit 10 via the receive leg of the data link, specifying that the telephone 1 be connected to a preselected digit trunk 207. This message is received by the data receiver 112 and transferred to the network control 114 via the data distributor 113. The network control in turn stores this message and translates it in order to effect connection of the appropriate line to the digit trunk in a predetermined time interval. At the same time the control unit 20 proceeds to connect the digit trunk 207 to a digit receiver 209 so as to transmit dial tone via the digit trunk to the telephone 1.

Telephone 1 now proceeds to dial or otherwise transmit the digits representing the called line. Upon completion of dialing, the control unit 20 sends a message to the switch unit 10 which removes the connection to the digit trunk and establishes instead a ringing connection to the called line with audible ringing return to the calling party at telephone 1. When the called party answers, an off-hook message is sent to the control unit 20 which returns the message to the switch unit 10 to terminate ringing and establish a talking connection.

As indicated in this example, all changes in supervisory states result in a data message being transmitted from the scanner 110 in the remote switch unit 10 to the control unit 20 and an answering message from the control unit 20 being received in switch unit 10 over the data link and utilized by the network control 114 to establish the appropriate connections in a predetermined time slot in each cycle of time slots. The content of the received message also determines its distribution in the switch unit 10 either to the network control 114 or through the attendant translator 115 to the attendant console 25.

It may be seen that all control operations are effected exclusive of the attendant console 25. Thus the attendant circuit is simply a translator with facilities for observing the condition of all telephones and trunks. The attendant facilities, however, operate in the same fashion as any telephone in exercising supervision.

The network control 114 consists of a store 120 to remember the calls in progress, which store is coupled through a line translator 121 to activate the appropriate time division gates in the switching network. New information from the data distributor 113 is gated into the store 120 during a read cycle when the number of a particular time slot agrees with a particular store address. During a write cycle of the store, information is gated from the store 120 to the line translator 121. The output of the line translator 121 is directed simultaneously to any predetermined pair of line gates, thus effecting their operation during a predetermined time interval. Trunk circuits 213 serve to connect PBX lines to other remote PBX's and to a central office. In addition to lines and trunks, tone sources other than dial tone, such as busy and audible ringing tones, are contained in the switch unit and have access through line gates to the transmission bus 100. The control unit 20 merely connects the tone source as a called party.

In a time division switching system, failures may occur in a common transmission bus as well as in common control circuits. The problem is aggravated by the remote location of the switch unit in relation to the control unit. Thus in order to obtain the desired reliability in the switch unit, the common circuits 110–115 and the transmission bus 100 advantageously may be duplicated. Each line or trunk then would have access to either transmission bus via separate gates. The gates associated with bus 100 would be controlled by one network control, and those with the duplicate bus, by the other network control.

*II—Control unit 20 (FIG. 2)*

As indicated heretofore, the instant system comprises a number of remotely located PBX switch units 10–*n* which are subject to instructions received from a centrally located control unit 20. Advantageously, the control unit 20 may be located at a telephone central office, while the PBX switch units 10–*n* may each be located in a different PBX customer's office.

The control unit 20 performs all of the logical functions required to process calls through each of the remote switch units 10–*n*. It may, for ease of description, be divided into two major sections, viz., the input-output section 21, and the call processing section 22, the former comprising the equipment which communicates directly with each of the switch units 10–*n* and central offices connected to the control unit 20, while the latter performs the actual processing required to establish and supervise calls at the various switch units 10–*n*. Thus a single memory unit in the input-output section 21 receives and stores information from all of the switch units and is capable of working with all of the switch units simultaneously. The call processing section, on the other hand, operates on one switch unit at a time and on one call at a time within a given switch unit. As each call is processed, any action required is formulated as a message and placed in the input-output section for transmittal to the proper switch unit. The two sections operate in independent time cycles. Also the input-output section 21 comprises wired logic as contrasted with the stored program which controls the call processing section 22.

*A—Input-output section 21 (FIGS. 3, 4 and 7)*

Figure 2:
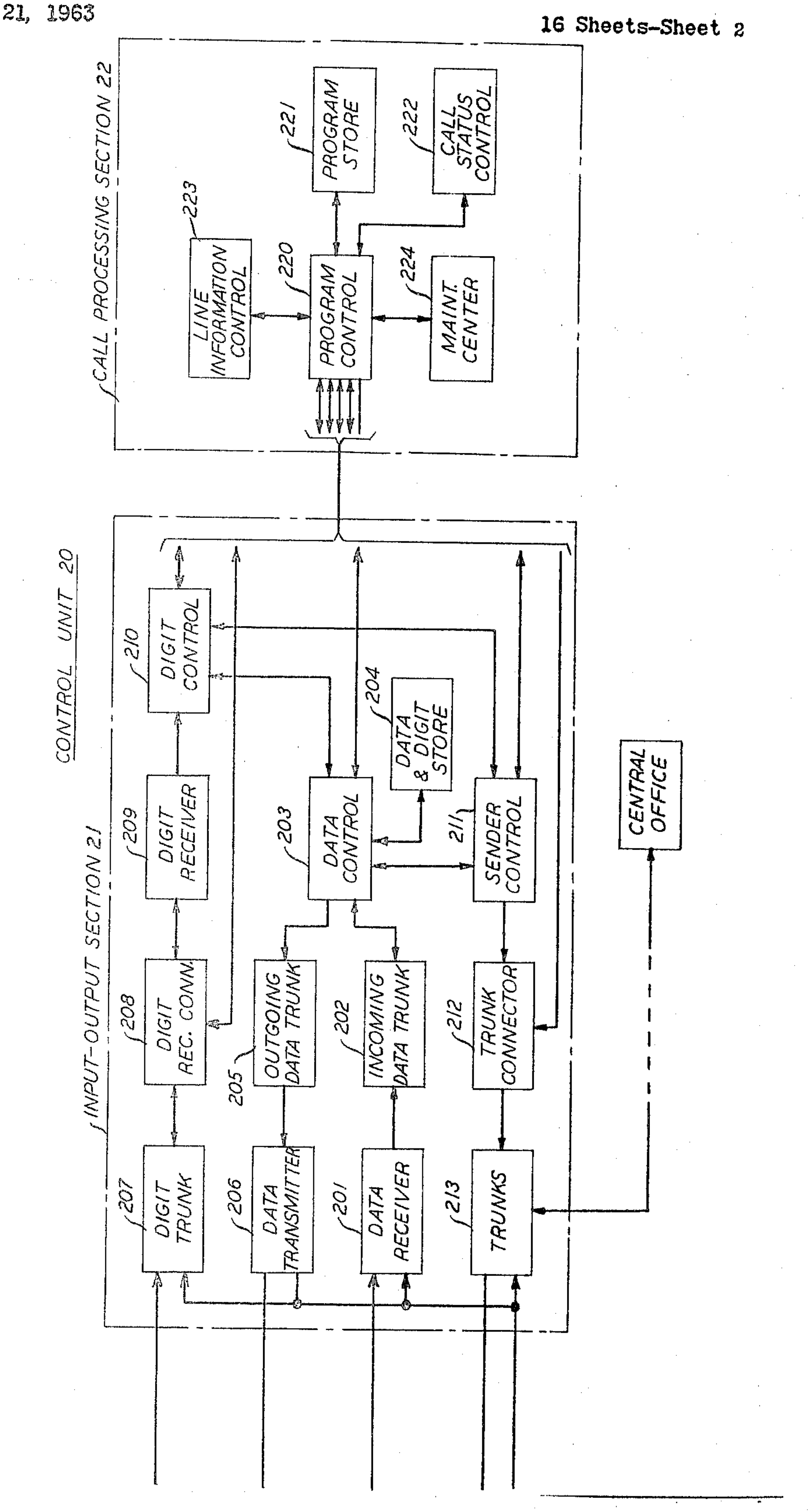

As illustrated in FIG. 2, the input-output section 21 of the control unit 20 is arranged to handle three types of information. Thus data is received from one of the switch units 10 via data links indicating the supervisory status of the various lines. Data is transmitted to the switch units over these data links in the form of instructions or commands to establish and disconnect the various lines. Incoming data is received in a data receiver 201 and transferred to the data and digit store 204 via an incoming data trunk 202 and data control 203. Outgoing data is taken from the data and digit store 204 and transmitted to the switch unit via the data control 203, an outgoing data trunk 205 and a data transmitter 206. The input-output section 21 also receives call destination information from calling parties via digit trunks as they dial or otherwise outpulse digits designating called lines. The third type of information comprises commands from the call processing section which are utilized for supervision of the trunks connecting the various switch units to each other or to central offices with provision for the outpulsing of line designation digits over these outgoing trunks.

*1—Input-output section storage*

The data and digit store 204 is the heart of the input-output section 21 which is required to store all data received from each switch unit 10–*n* and from the call processing section 22 and to retain incoming and outgoing digits designating calling lines. For these varied functions a temporary or buffer store is provided, advantageously comprising a ferrite sheet, as disclosed for example, in R. L. Ashenhurst et al. Patent 2,912,677, issued November 10, 1959.

Figure 16:
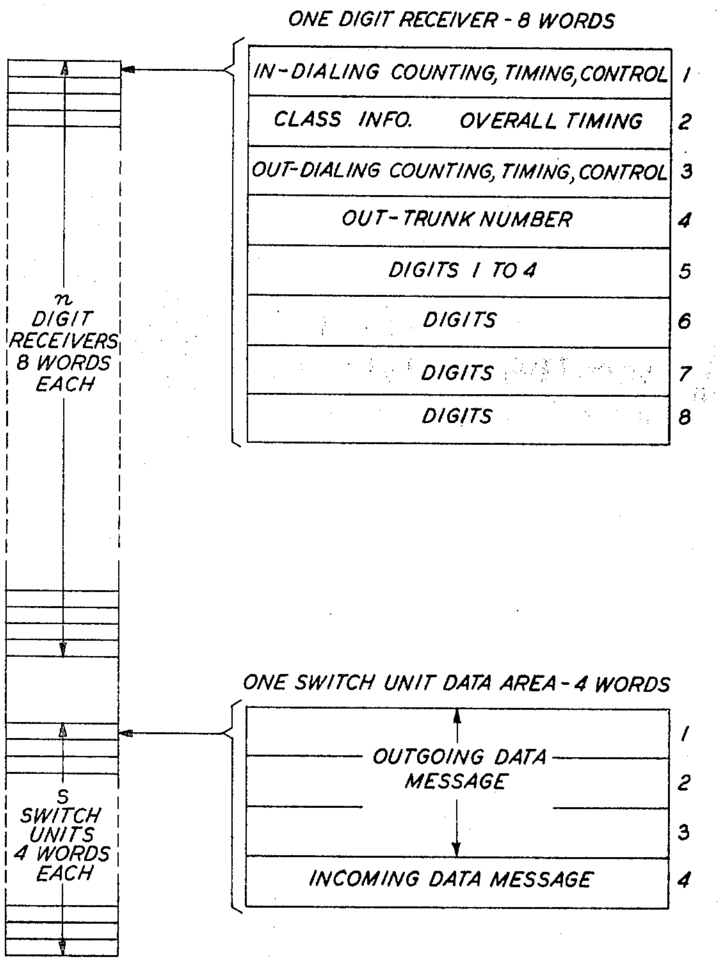
FIGS. 16 and 17 depict the typical content of the various memory units contained in the control facility.

The master scanning cycle for observation of the various trunks, as illustrated in FIG. 16, is established in the data control 203 with the aid of the system clock. The memory layout in the store 204 in accordance with this scan cycle is illustrated in FIG. 16. During the first part of each cycle, the portions of the store 204 associated with a group of digit receivers 209 are addressed in sequence concurrent with the addressing of the corresponding digit receiver 209. New information concerning the designation of called parties, if any, derived from such sampling, is placed in the store 204 with the aid of the digit control circuit 210.

If the call with which the particular digit receiver 209 and the corresponding portion of the store 204 are then associated requires outpulsing, as when the called party is located outside the switch unit terminating the calling line, the necessary information for pulse construction is extracted from the store 204 during the period that the digit receiver 209 is being scanned.

Inasmuch as scanning of the digit trunks 207 associated with switch unit is accomplished at a much greater rate than the receipt of digits from any given switch unit, it is not necessary to sample all of the digit receivers 209 during one scan cycle. Thus the digit control 210 is arranged so as to direct the scanner in the data control 203 to only three out of the *n* receivers in each scan cycle.

During each scan cycle following the portion devoted to observing the three receivers, switch unit data storage areas each comprising three outgoing message words and one incoming message word for each of the switch units are addressed sequentially by direction of the data control 203. Simultaneously, the data control 203 actuates corresponding incoming data trunks 202 or outgoing data trunks 205.

*2—Data transfer equipment*

The data receiver 201 is coupled to the send lead of each data link so as to receive messages indicating changes of state at stations in each switch unit. The messages are received in a particular coded form consisting of frequency shift, binary pulses. The data receiver 201 comprises conventional elements capable of detecting and demodulating such coded information, placing it in a form which may be utilized by the data processing equipment in the control unit 20. It also serves to recover timing signals from the various data links, which signals are used to indicate to the data processing equipment of the control unit 20 the beginning of each binary digit, as well as to regenerate output data signals.

Timing recovery is accomplished by conventional circuitry comprising an oscillator, a wave shaper and a frequency divider. The resulting data, in the form of binary digits, is sampled by an associated incoming data trunk 202 and placed in the data and digit store 204 via logic circuitry in the data control 203.

The incoming data trunk 202 receives the data from the receiver 201 as a series of mark or space signals representing binary digits, together with appropriate synchronizing signals, and combines such information with timing signals from a clock circuit in conventional logic circuits comprising OR gates and flip-flops to route the data to the data control 203. The data is delivered serially, information in the trunk being sampled at a rate greater than the binary digit (bit) rate of the message. The logic circuitry is arranged so that each bit can be received and placed in storage while preventing multiple sampling of any one bit regardless of the bit length.

A scanner circuit in the data control 203 looks at the line condition information received by the incoming data trunk 202 from the data receiver 201 associated with each switch unit once in each scan cycle. The data control 203 assures that the proper area in the data and digit store 204 is being addressed and, when such is the case, permits the information received from the incoming data trunk 202 to be gated into the store 204.

The data control 203 is associated with the data store 204 in such a manner as to permit the orderly insertion and withdrawal of data and digits designating called lines. It also comprises appropriate logic circuitry for supporting operations of the digit control 210, the sender control 211 and various components in the call processing section 22.

The routine addressing and scanning operations are performed by the data control 203 in sequence, subject to interruption at any time by the call processing section 22 to remove data from the store 204 for appropriate processing or to insert data therein for subsequent transmission to the appropriate switch unit. The scanning cycle is designed to permit such interruptions without affecting its basic period. Upon execution of the commands received from the call processing section 22, the normal scanning operation is resumed by the data control 203 from the point at which the interruption occurred.

The counterpart of the data receiver 201 is the data transmitter 206, which serves to convert the data elements of the messages presented to it to frequency shift binary pulses for transmission over the receive lead of the appropriate one of the data links to the designated switch unit. The transmitter 206 comprises conventional modulator, filter and transformer components for performing the necessary conversion.

The outgoing data trunk 205 is alerted by the data control 203 each time it is determined that a data element is due for transmission to a particular switch unit 10–*n* corresponding to the alerted trunk 205. The outgoing trunk 205 utilizes this signal representing the binary digit 1, together with signals from the system clock, to generate and deliver to the data transmitter 206 a full length data element.

3—*Digit transfer equipment*

The digit trunk 207 connects a particular switch unit to a digit receiver 209 under control of the digit receiver connector 208. The digit trunk circuit 207 consists of an input transformer, a voltage limiter, a filter, and a pair of switches for resonant transfer of signals stored in the trunk circuit to the digit receiver 209 on a time division basis. Such circuitry is conventional, the time division gates and resonant transfer operation being disclosed, for example, in W. D. Lewis Patent 2,936,337, issued May 10, 1960. Thus digits received from the remote switch unit 10 in the digit trunk 207 are assigned to a particular digit receiver 209 via common links shared by all digit trunks connected to corresponding remote switch units. The circuit is bilateral, permitting transmission of dial tone generated at the digit receiver 209 to a switch unit 10.

The assignment of digit trunks such as 207 and digit receivers such as 209 is controlled by the digit receiver connector 208. It also commands the digit receiver 209 to transmit dial tone to the digit trunk 207. Upon receipt of all digits designating a particular called line in the digit receiver 209, the digit receiver connector 208 breaks down the connection between the digit receiver 209 and the digit trunk 207.

When the call processing section 22 requires that a particular digit receiver 209 be connected to a particular digit trunk 207 associated with a given switch unit 10, it transmits a message to the digit receiver connector 208 containing the designation of the switch unit, the digit trunk 207 and the digit receiver 209 involved, together with the fact that this is a new message.

This information is registered temporarily in the digit receiver connector 208, permitting the ball processing section 22 to proceed to other tasks. The digit receiver connector 208 in turn locates the portion of a memory unit contained therein corresponding to the designated digit receiver 209 and proceeds to write the switch unit and digit trunk 207 designations in this area. The distinct areas in the memory unit corresponding to the various digit receivers 209 are scanned sequentially and information read out is held temporarily in a register. Concurrently, the designation of the storage area itself corresponding to the particlular digit receiver 209 is also held in a temporary register. Subsequently, the information held in a temporary registers is transmitted through a pair of translators and serves to enable the time division switches in the designated digit trunk 207 and digit receiver 209 so as to permit the resonant transfer of information therebetween.

As this was designated as a new message by the call processing section 22, the translated designation of the digit receiver 209 also includes a command to enable a dial tone generator, such that on subsequent scans of this receiver, dial tone will be transmitted through the corresponding digit trunk 207 to the designated switch unit. The digit receiver 209 is also prepared to receive digits from the switch unit, the first one of which will reset the dial tone flip-flop so as to cut off dial tone transmission.

Thus the primary components of the digit receiver connector 208 are involved in the memory unit containing specific areas allotted to corresponding digit receivers 209. The memory unit may be of the magnetic core type utilized in the switch units. Such a memory is referred to as the inhibited fluxor, described for example in J. L. Rogers Patent 2,926,342, issued February 23, 1960. In addition to the memory, the unit comprises appropriate drive and translation circuitry, with timing under control of the system clock. These features are essentially the same as those illustrated in the switch unit network control 114. The particular components include typical logic circuits such as AND and OR gates, flip-flop counters and shift registers.

The digit receivers 209 are the connecting links between the digit trunks 207 and the digit control 210. As indicated heretofore, a digit receiver 209 under control of the digit receiver connector 208 is connected via a time division common bus to a particular digit trunk 207, which in turn corresponds to a particular one of the switch units 10–*n*.

Upon establishment of the connection, the digit receiver 209 furnishes dial tone to the switch unit and informs the digit control 210 when this has been done. When the digit signals converted to tone signals at the switch unit are received through the digit trunk 207, they are decoded in a conventional manner and combined with signals originated in the digit control 210 to permit the digit control 210 to select appropriate output signals from a particular digit receiver 209.

The first such digit signal received from a switch unit also causes the digit receiver 209 to stop sending dial tone. After the digit receiver 209 has completed its function, i.e., received all of the digits from the calling line designating a particular called line, as determined by the call processing section 22, it is connected from the digit trunk 207. It is then reset in a condition preparatory to its assignment to another call by the digit receiver connector 208 and so informs the digit control 210. In addition to the time division gates and filters, the digit receiver 209 comprises conventional logic circuitry such as AND and OR gates, plus a tone receiver circuit as known in the art.

From the foregoing it is apparent that the basic function of the digit control 210 is to provide for the insertion of digit information concerning a called line, as provided to the data and digit store 204 by a calling line. This information is obtained by the digit control 210 from sampling the various digit receivers 209. It further determines when all or part of the stored digits should be transferred to the call processing section 22 for the latter's analysis and cooperative action. It also functions in conjunction with the sender control 211 on calls placed to areas remote from the switch unit originating the call.

The outputs of the digit receiver 209 are translated by conventional translator circuits in the digit control 210. A decoder circuit determines from the first pulse received from the digit receiver 209 through the translators whether the digits are of the dial pulse or tone type. If they are of the dial pulse type, they are separately timed and counted in a conventional manner prior to insertion in the data and digit store 204.

4—*Call connection*

The basic operation of the input-output section 21 may be illustrated by the establishment of a connection between a calling party in switch unit 10 and a called party reached through the central office, FIG. 2. When the calling party originates the call, switch unit 10 observes the off-hook condition on the calling line and transmits the line identification and the off-hook condition indication serially via the data link to the data portion of the input-output section 21. This information then is retained in the data and digit store 204 until the call processing section 22 is ready to consider it. When this time occurs, the information is transfererd in parallel to the call processing section 22 which in turn locates an idle digit trunk 207 and receiver 209.

Subsequently, instructions are returned through the data control portion and, via the data link, to switch unit 10 for connection of a preselected digit trunk to the calling line in the time interval assigned to the call. The digit portion of the input-output section 21 also receives appropriate commands from the call processing section 22 so as to permit interconnection of a predetermined digit trunk 207 and receiver 209 in the assigned time interval.

Following assignment of a digit receiver 209 to a call, dial tone is applied through the digit trunk 207 to the calling line. The calling party, upon receiving dial tone, proceeds to dial or otherwise designate the digits of the called line. The digit signals pass through the digit trunk 207 and are received in the assigned digit receiver 209. Such information varies in accordance with the type of call being placed. Thus on an outgoing call through the central office, a distinct number of digits will be transferred to the call processing section 22. The call processing section 22 then activates the sender control 211 of the input-output section 21 to outpulse the called line digits through one of the trunks 213. In this instance the digits have been stored in the input-output section 21 by action originating in the call processing section 22, i.e., the calling party is required to dial fewer digits than are required to complete the connection to the called line.

If both the calling and called parties had been located at switch unit 10, the call processing section 22 would have requested that the data portion of the input-output section 21 deliver the called line digits through the data link to the switch unit 10, such digits again being stored in the input-output section 21 prior to the transfer command received from the call processing section 22.

The call thus established will be monitored at switch unit 10 with the control unit 20 kept currently advised by information transmitted through the data link. It may be seen, therefore, that the input-output section 21 acts as a buffer between the call processing section 22 and the various remote switch units and telephone central offices.

Figure 3:
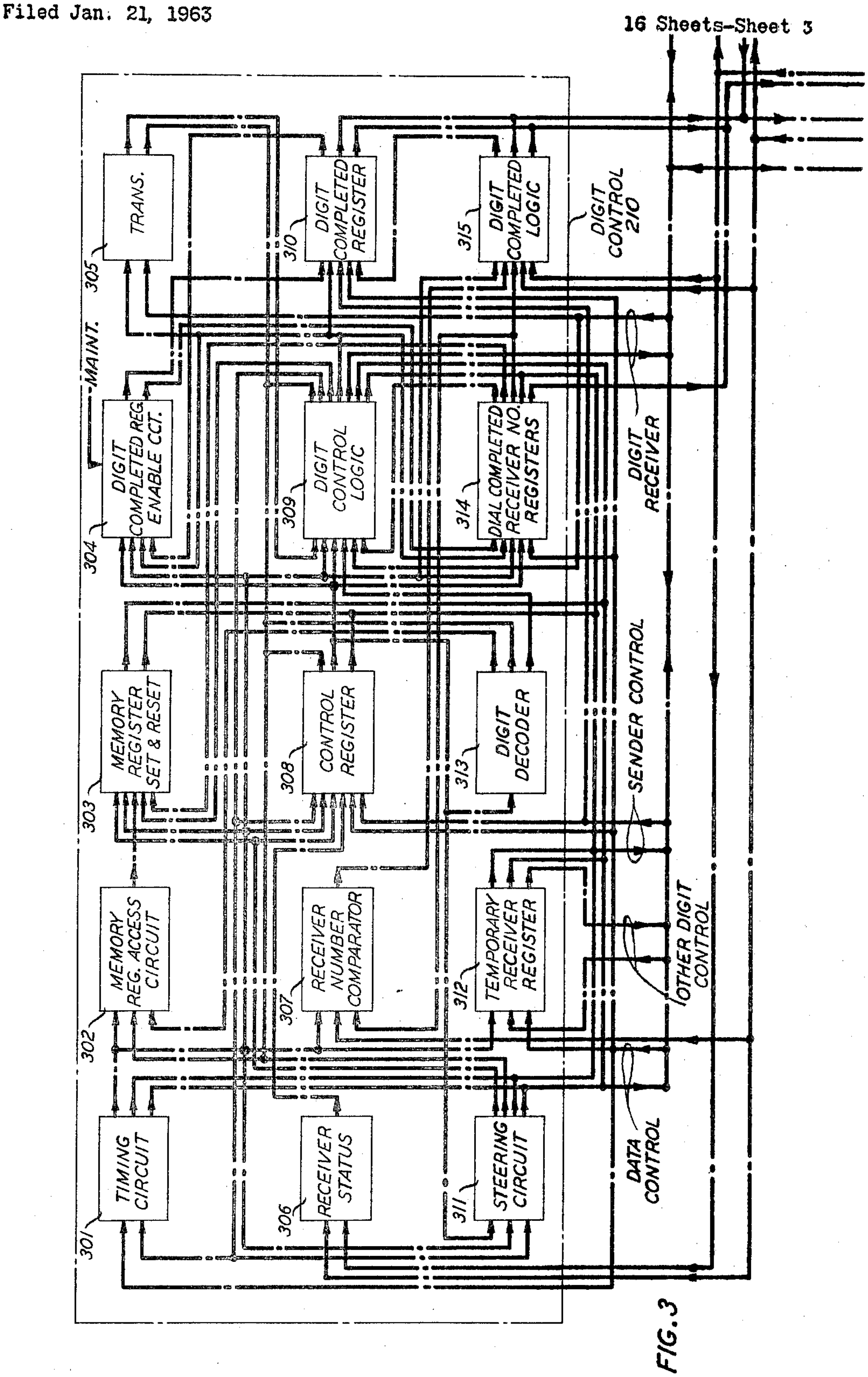
Figure 4:
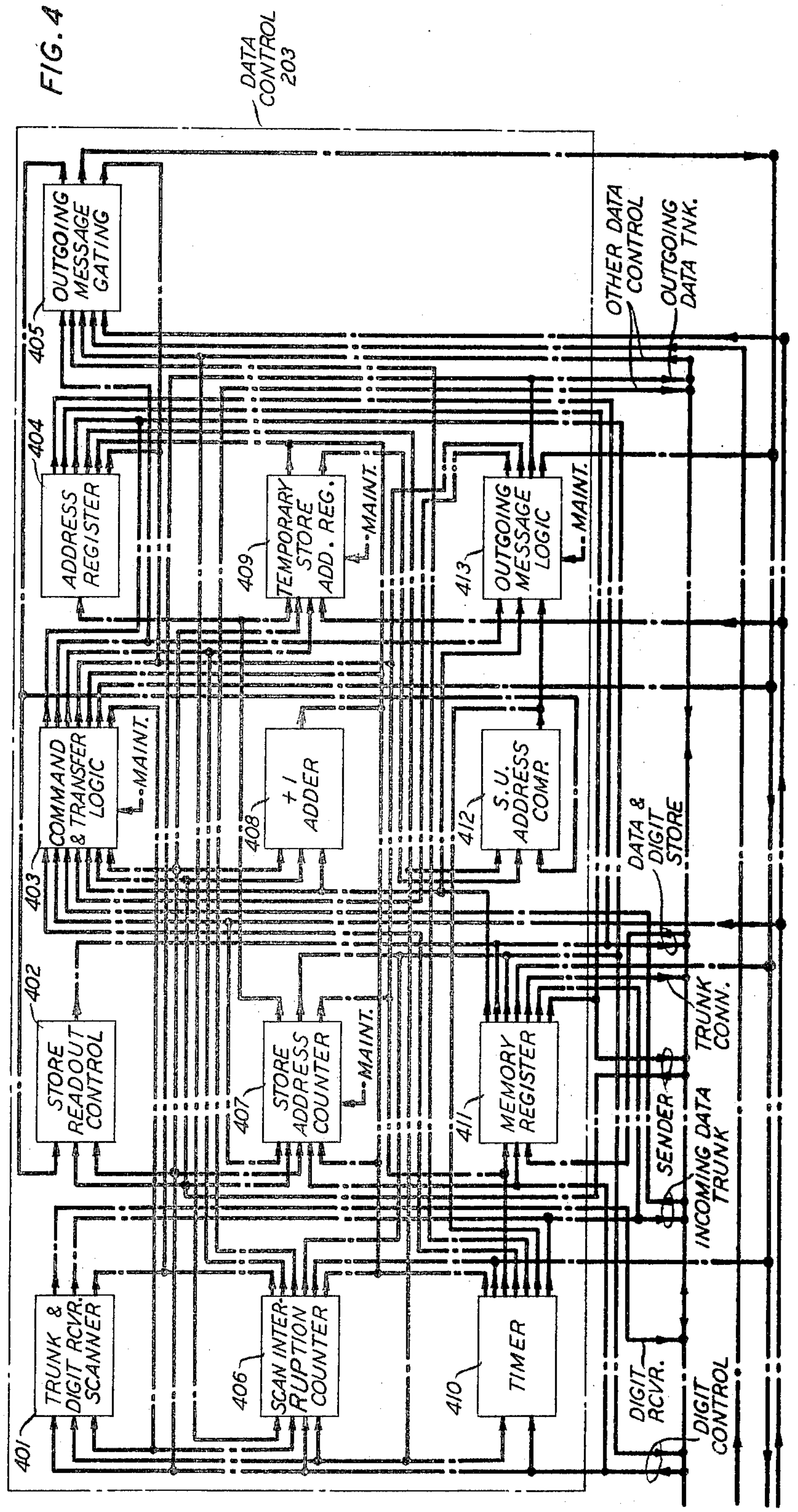
Figure 7:
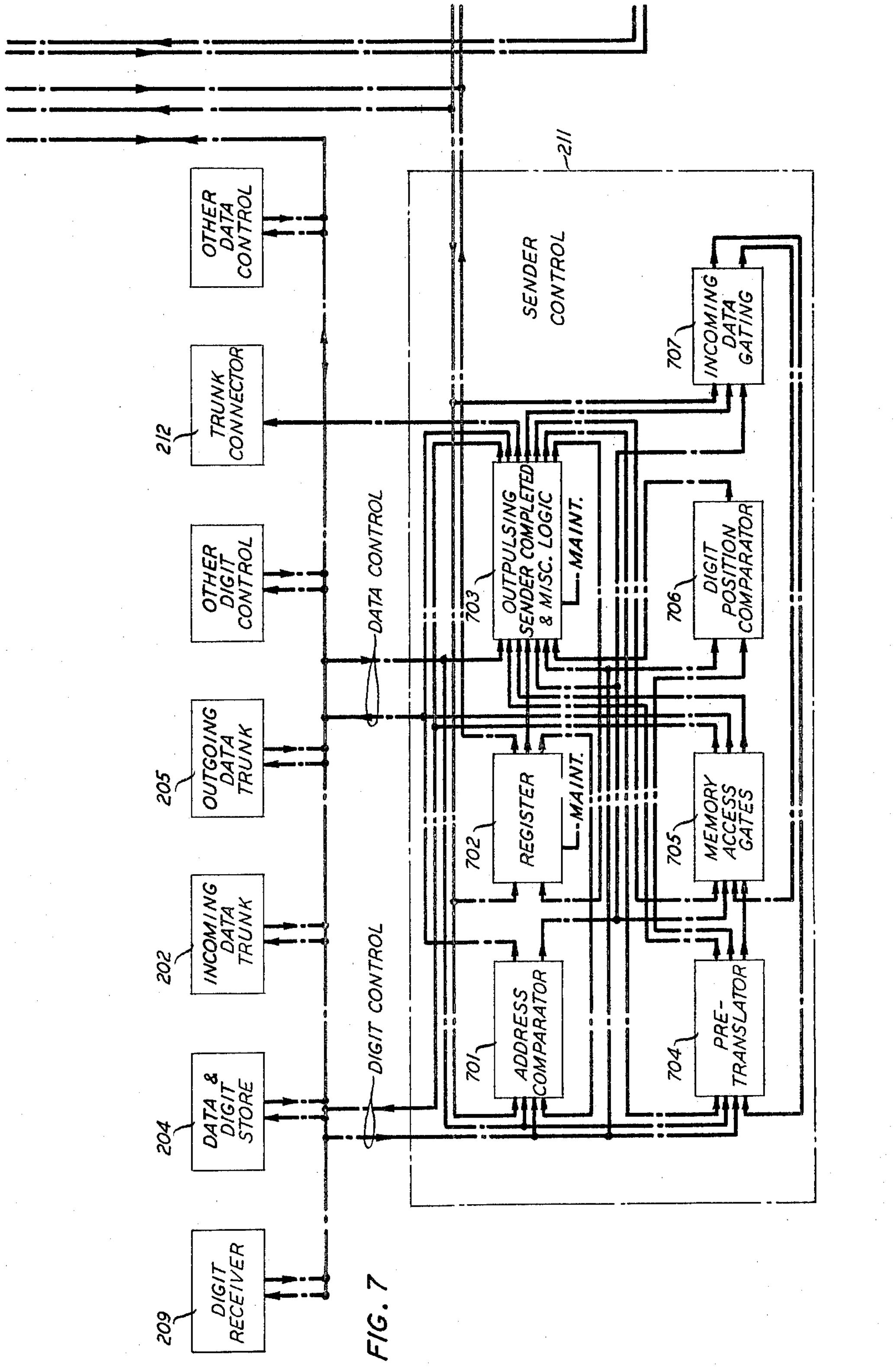

Considering, then, the specific control components of the input-output section in greater detail, reference is made again to FIG. 2 and to FIGS. 3, 4 and 7.

5—*Data control 203* (FIG. 4)

The data control 203 is illustrated in more detail in FIG. 4. As indicated, this circuit provides a means for receiving, storing and delivering incoming or outgoing data. Incoming data is accepted serially from the various switch units, stored in the data and digit store 204 and, upon command from the call processing section 22, delivers the stored information thereto in parallel. Similarly, outgoing data is deposited in parallel in the data and digit store 204 and delivered serially without interim delay to any of the remote switch units to which the message is directed. A sequential scan cycle generated to control these input and output data functions with the aid of a system clock is used to coordinate the operation with the call processing section 22, digit control 210, and sender control 211.

In normal operation, the trunk and digit receiver scanner 401, FIG. 4, store address counter 407, and address register 404 are used to scan sequentially the digit receivers 209, incoming data trunks 202, and outgoing data trunks 205 while also allowing for a predetermined number of interruptions to facilitate processing of commands from the call processing section 22.

The memory layout of the data and digit store 204 to accommodate all such information is depicted in FIG. 16. Thus information obtained from each digit receiver 209 is placed in an area accommodating the eight words of control and digit information pertaining to such receiver. A similar area is set aside for each of the $n$ digit receivers 209. Space is also allocated for the storage of a data message containing four words referring to a corresponding switch unit, which words include an outgoing data message and an incoming data message. There is one such data storage area for each switch unit in the system.

In a complete scan of the data and digit store 204 under control of the data control 203, messages pertaining to three digit receivers and all switch units are observed. It is not practical or necessary to sample all digit receivers and their corresponding storage areas during each scanning cycle. Thus the digit control 210, upon receiving instructions from the data control 203, will direct each scan to three digit receivers 209 during each scanning cycle. The corresponding digit receiver storage areas in the data and digit store 204 are observed simultaneously with the address of a digit receiver 209. Following action involving the digit receivers, the switch unit data storage areas are observed in sequence during one scanning cycle.

Simultaneously with the observation of outgoing data messages in a given data area, the corresponding data trunks 205 are activated. Each time this occurs, one binary digit or bit of an outgoing message is transferred to the corresponding outgoing data trunk 205 and subsequently transmitted to the desired destination switch unit. After each bit transmission, the remaining bits in the message are shifted one position in the store 204 by action of the data control 203. Similarly, an incoming message is received from the incoming data trunk 202 and stored a bit at a time in the corresponding data area of the data and digit store 204. It is shifted down the allotted message space as succeeding bits are received. The memory register 411 receives bits read out of the store 204, makes them available to other circuits in the control unit 20, and subjects them to change, if required, as well as retaining them for reinsertion in the store 204.

As indicated, the call processing section 22 may command the interruption of the normal scanning sequence at any time to withdraw information from the data and digit store 204 or to insert information therein. The scan cycle is designed to permit a predetermined number of such interruptions without affecting the basic scan period. During such interruptions, the address next to be utilized in the normal sequence is placed in the temporary store address register 409, and the address register 404 is forced to the address commanded by the call processing section 22. Upon execution of the command, the normal scanning routine is resumed from the point indicated by the address in the temporary store address register 409.

Considering, first, the normal sequential scan routine, appropriate cross connections between the trunk and digit receiver scanner 401 and digit receivers 209 are permanently wired such that a designated digit receiver is activated simultaneously with the addressing of the corresponding storage area in the data and digit store 204 by the address register 404. Thus the trunk and digit receiver scanner 401 contains circuitry, as known in the art, for directing a particular address to the designated circuit upon order from the command and transfer logic 403 at the proper time, as determined by the digit control 210. However, control is exercised by the command and transfer logic 403 only during receipt of a command from the call processing section 22 which interrupts the normal scanning sequence and permits random access to the trunks and digit receivers. Directions from the command and transfer logic 403 are under the control of timer 410, which is in turn regulated by a clock which provides distinct operating time intervals to all circuits in the input-output section 22. Such timing is independent of that governing the operations of the call processing section 22.

Actual stepping through the scan cycle is initiated by the store address counter 407, which is a typical binary counter well known in the art. Output leads from the various stages of the counter 407 are used to set the address register 404 and either the temporary store address register 409 or a temporary register in the digit control 210, the latter settings being implemented only upon interruption of the normal scan by a command from the call processing section 22.

The sender control 211 gains access to the store address counter 407 through a series of inputs for random address purposes, while another set of inputs provides the means for transferring the content of the temporary store address register 409 back into the store address counter 407 upon resumption of sequential scanning.

Upon completion of the activity involving a particular digit receiver 209, the address counter 407 provides the digit control 210 with a signal to advance to the next digit receiver address. In the normal scanning pattern, the address counter 407 is reset at the end of a particular receiver operation of a trunk operation, unless a command from the call processing section 22 interrupts the normal scanning sequence, in which event the counter 407 is reset from other sources.

The address register 404 comprises a conventional flip-flop register which is set to a new address by inputs from the stored address counter 407 at the outset of a scanning cycle and subsequently maintains states corresponding to the address counter as the scan cycle continues. The chief function of the address register 404 is to address the data and digit store 204 and to keep all logic circuitry in the data control 203 as well as digit control 210 and sender control 211 advised as to the current address. The internal circuitry of the data control 203 which is driven by the current status of the address register 404 includes the trunk and digit receiver scanner 401, the switch unit address comparator 412, the scan interruption counter 406, the timer 410, and the address counter 407.

The scan interruption counter 406 comprises logic circuitry including conventional binary counting circuitry arranged to count the number of interruptions of the normal scanning cycle by commands received from the call processing section 22. If, upon completion of a scanning cycle, less than a predetermined number of commands have been received as recorded in the scan interruption counter 406, the latter will add a sufficient number of intervals to total the predetermined number of possible command interruptions before activating circuitry which will reset the address counter 407 and the digit control 210 preparatory to the next scanning cycle. Also the scan interruption counter 406 keeps the call processing section 22 currently advised as to the number of command interruptions available in the predetemined allotment for the scanning cycle in progress. If the allotment is used up prior to termination of the current scanning cycle, the scan interruptions counter 406 will activate inhibit leads to prevent the call processing section 22 from initiating commands which could not be completely executed in the current scanning cycle. The scan interruption counter 406 also alerts the temporary store address register 409 as to the need for inhibiting receipt of additional commands in the event that the call processing section 22 ignores the inhibit command signals received directly from the scan interruption counter 406.

The call processing section 22 initiates four different commands of interest in connection with the functions of the data control 203. The start sector scan command will interrupt the normal sequential scan of the data and digit store 204 to determine if a complete incoming message is ready for delivery to the call processing section 22 and also to determine if the outgoing data trunk 205 to a particular switch unit is available to transmit a new message. This information is obtained by an interruption of the sequential scan to address one outgoing data message word and the incoming data message in the store area allotted to the particular switch unit under consideration. The appropriate address for this command is inserted in the address register 404, while the next address in the sequential scan is placed in the temporary store address register 409. An all zero condition in the outgoing data message will indicate that the outgoing data trunk 205 has completed transmission of the previous message and is now available to handle the new message. This is guaranteed by the fact that the last bit of a message to be transmitted is a control bit which is always a one. In similar fashion, interrogation of the incoming data message area for the status of a particular control bit will indicate to the call processing section 22 the current availability of a complete incoming message to be acted upon. During the same operation, information is available indicating the parity of the messages being observed, which is made available on incoming messages to the call processing section 22 and which is added to outgoing messages for subsequent action by the switch unit receiving the message.

A second command which serves to request a data trunk will be repeated in successive scans of this particular storage area if a busy outgoing trunk is encountered.

The third command serves to insert a new message in an idle outgoing data trunk 205. Thus when the previous command indicates that an outgoing trunk has become idle, the current command will load the outgoing data message areas of a designated switch unit data storage area in successive scans of the data and digit store 204.

The final command serves to address a digit receiver storage area in the data and digit store 204 as one step in the process of outpulsing digit information to a central office or over a tie trunk to another PBX under direction of the sender control 211.

All of these commands share common logic circuitry in the data control 203, principally in the temporary store address register 409 and the command and transfer logic 403. Thus the common operations required for all such commands are the interruption of the sequential scan and the temporary registration of the address from which to resume scanning in the temporary store address register 409.

On commands to load an outgoing data trunk 205, serial readout of an outgoing message immediately following completion of its transfer from the call processing section 22 to the data and digit store 204 must be delayed for one scanning cycle if the content of the temporary store address register 409 is the same as that included in the received command. For this purpose, the switch unit address comparator 412 is provided so as to assure detection of the condition and to arrange for the appropriate delay by activating the outgoing message logic 413.

The memory register 411 acts as a buffer between the associated data and digit store 204 and the logic circuits which furnish the data to be stored therein, or which act upon the data already stored therein. The memory register 411 comprises conventional flip-flop circuits and associated AND and OR gates to facilitate destructive or nondestructive readout, as desired. It also performs a counting function together with the adder circuit 408 in updating the data control 203 or sender control 211, as required. Certain of the additional logic circuitry ancillary to the main functions of the memory register 411 performs parity checking operations on incoming messages and generates parity information to be included in outgoing messages.

Incoming data may be received from any one of the incoming data trunks 202 associated with corresponding switch units in the system. The data from each of the incoming trunks 202 is directed in sequence to the memory register 411. The particular data bits are applied to the parity check logic circuitry associated with the memory register 411, and after suitable checking, are entered in the memory register itself.

Advance from one register stage to the next is determined by the status of a control lead, common to all of the incoming data trunks 202, contained in the command and transfer logic 403. The data shifting process will be inhibited only if data is absent or if a particular digit is sampled more than once due to differences in sampling rate. When the message is complete and has been appropriately stored in the data and digit store 204, the command and transfer logic 403 is activated by the next request from the call processing section 22 for a new message from the corresponding switch unit to gate the new message from the data and digit store 204 in parallel to the call processing section 22 and to subsequently clear the store.

Outgoing messages are first written in the store 204 in parallel in the oppopriate storage areas under control of the call processing section 22 and the outgoing message gating circuit 405. The instant embodiment contains duplicate data and digit stores and duplicate program control circuits in the call processing section 22, and the outgoing message gating circuit 405 provides complete flexibility for storage of messages in either store 204 via the appropriate memory register 411 under control of either program control. Selection of the duplicate data and digit store also causes activation of the store readout control 402 to inhibit readout of the store 204.

Serial readout of the outgoing data message commences upon the next enablement of the appropriate outgoing data trunk 205 during the sequential scan under control of the outgoing message logic 413, which activates leads to all of the outgoing data trunks 205 whenever the bit to be transmitted is a one. At the end of a scanning cycle, the scan interruption counter 406 acts to set a flip-flop in all of those trunks partially enabled by the outgoing message logic 413 so as to transmit a one. Subsequently, the scan interruption counter 406 resets all of the trunks simultaneously before the next scan cycle is initiated.

The process is initiated when the first word of the outgoing data message in the corresponding switch unit storage area of the data and digit store 204 contains information ready for transmission to the appropriate switch unit. When this first word is read out of the data and digit store 204 by the outgoing message logic 413, the ready condition is recognized as a distinct condition in two stages of the memory register 411 which receives the word from the data and digit store 204. If there is no command currently in progress and the appropriate conditions are indicated by the memory register 411, the outgoing message logic 413 re-enters the content of the memory register 411 in the area of the data and digit store 204 from which it was withdrawn. It also prepares the outgoing data trunk 205 for transmission of the first binary digit or bit of the instant message, updates parity in the memory register 411 and sets the command and transfer logic 403 so as to inhibit the shift of data in the store 204.

Except during command intervals, conditions in the outgoing message logic 413 are now such as to permit the transmission of the first bit of the stored outgoing data message as well as succeeding bits in the message during subsequent scanning cycles. As bits are transferred through the outgoing message logic 413 to the outgoing data trunk 205, the remaining bits in the first word of the outgoing data message stored in the switch unit data storage area are shifted one position each time the memory register 411 reinserts the previously withdrawn bit in the data and digit store 204.

The command and transfer logic 403 is set in such a fashion, however, that the bits in the second and third words of the outgoing data message are not shifted until the transfer operation reaches their respective word positions and begins removing bits therefrom. Eventually, all of the data bits of the first word are shifted out of the data and digit store 204, and the content of the memory register 411 will be observed by the outgoing message logic 413, which in turn permits transmission of a bit to the data trunk, updating of parity and, at the proper time, permits the command and transfer logic 403 to shift the bits in the second word of the outgoing data message for transmission to the appropriate switch unit.

In the next scan, the bits of the first word which have now been transmitted are erased from the store by action of the outgoing message logic 413 via a path through the command and transfer logic 403. A similar pattern is followed for the transfer of bits in the second and third word of the outgoing data message. Each time during the process of retrieving the three words of the stored outgoing data message that a word is scanned and found to contain all zeros, indicative of a completed transfer, the call processing section 22 is appropriately notified through the outgoing message logic 413.

6—*Digit control 210* (*FIG. 3*)

The digit control circuit 210, FIG. 3, is designed to store the digits identifying a called line, as provided by a calling line in one of the switch units 10–*n*, either by the conventional rotary dial operation or multifrequency pulsing. These digits are transmitted from the subsets via the associated switch unit to a corresponding digit trunk 207 and digit receiver 209 in the input-output section 21. Upon receipt of an appropriate command, the digit control 210 transfers the reecived digits to the call processing section 22 for analysis. It also cooperates with the sender control 211 to outpulse digits over trunks 213 to a central office or to other PBX's. The digit control 210 utilizes a portion of the storage area in the data and digit store 204, as indicated in FIG. 16.

In this embodiment, eight words in the data and digit store 204 are assigned to each digit receiver 209 connected to the digit control 210. Four of these eight words are used for supervisory control information. The remaining four words are used to store the digits received from the associated one of the digit receivers 209. FIG. 16 indicates the storage pattern.

Briefly, system operations leading to the point at which the digit control 210 becomes involved are as follows: The calling line registers the off-hook condition which the scanner at the switching unit detects and indicates to the control unit 20. The data control 203, upon request, transfers this off-hook message to the call processing section 22 which subsequently finds an idle digit receiver 209 and an idle digit trunk 207. The digit receiver connector 208 is alerted as to the trunk and receiver assignment and proceeds to connect the calling line to the assigned digit trunk on a time division basis. The calling line now transmits the digits designating the called line to the assigned digit receiver 209 through the assigned digit trunk 207 under control of the digit receiver connector 208.

The digit receivers 209 are sampled in a predetermined manner during a scanning cycle, as discussed in connection with the data control 203, such sampling being under control of the store address counter 407, FIG. 4. The appropriate words in the store 204 assigned to this digit receiver 209 are addressed simultaneously with the connection to the corresponding digit receiver 209. At this time the digit receiver 209 provides a suitable tone signal through the digit trunk 207 to advise the calling party that he may begin transmission of the digits identifying the called line. This tone signal also registers a busy condition in the associated storage area of the data and digit store 204. From that time until the first digit is received, the digit control 210 counts time for the purpose of performing time-out to clear the system in the event that the digits are not received within an appropriate interval.

The digit control 210 also recognizes and distinguishes between dialed digits and multifrequency pulses, performs distinct operations of each type of received digit information, and stores the digits in the assigned area of the data and digit store 204.

Several types of calls may be initiated, and the digit control 210 must distinguish between them, based upon the first digit received, and take appropriate action. For intra-PBX calls, three digits are transferred to the call processing section 22. On inter-PBX calls, two digits are so transferred, and on calls from a switch unit through a central office, only a single digit is transferred to the call processing section 22. In all cases, the digit control 210 performs a pretranslation function on the first digit to determine the number of digits it must receive before performing the transfer to the program control 220.

Again, on intra-PBX calls, the digit control 210 completes its function upon transfer of the called line digits from the data and digit store 204 to the call processing section 22 and clearing of the appropriate storage area in the data and digit store 204.

For the other types of calls, the transfer to the call processing section 22 is effected prior to receipt of all of the digits. Thus the storage area is not cleared at this time. Such clearing is performed subsequently by action of the sender control 211 upon completion of the outpulsing of digits to the central office of other PBX. It is at this time that the storage area containing the called line designation is cleared and the call processing section 22 informed that it may now release the digit trunk 207 and digit receiver 209. The clearing operation is performed by inhibiting the rewriting operation in the destructive readout type store 204 after the message has been transferred.

During each scanning cycle, the storage areas corresponding to three digit receivers are observed. During each such observation, seven of the eight words stored in the digit receiver area, FIG. 16, are read out under control of the store address counter 407 in the data control 203. The first four words, containing supervisory control information, are observed in sequence. If a called line digit is being received, the corresponding digit storage area is then observed. If such is not the case, the store 204 will be addressed instead to the first word in the same digit receiver storage area, and no action will be taken. If the sender control 211 has been called into operation by the call processing section 22, the store 204 may be addressed to one of the four digit words at this time. However, during the seventh word address time, the store 204 is always addressed to the third word in the digit receiver storage area, so that the sender control 211 may update its appropriate supervisory information. The various timing operations associated with this scanning routine are performed by the timing circuit 301 in conjunction with the system clock.

The individual component blocks in the digit control 210, as illustrated in FIG. 3, comprise logic circuitry well known in the art, such as AND and OR gates and flip-flop registers and counters.

a—*Components*

The temporary receiver register 312 constitutes a series of flip-flop register stages for storing the address of the next digit receiver 209 to be sampled while the data trunks 207 are being scanned. The address of this digit receiver 209 is gated from the store address counter 407 in the data control 203 to the register 312. When the next scan cycle is initiated, with observation of the next group of three digit receivers, a stop pulse is transmitted to the digit control 210 by the data control 203. Simultaneously, the digit receiver address contained in the register 312 is gated to the address register 404 in the data control 203. Thus the temporary receiver register 312 is utilized as a buffer during the sequential scanning of all digit receivers 209 in groups of three in each scan cycle.

When the last digit receiver 209 has been scanned, the scanning routine returns to the first digit receiver and begins the scanning routine anew by providing the address of the first digit receiver to be scanned to the temporary receiver register 312. This address is placed in register 312 upon recognition of the last group of three digit receivers in the previous scan cycle. During the next digit control time, this address is utilized to inhibit input gates which normally transmit the digit receiver address from the store address counter 407 to the temporary receiver register 312. It is necessary to inhibit this address in order to insert the desired first digit receiver address to be sampled in the next scan cycle.

It is possible to interrupt the scan of any digit receiver 209 by means of an interruption command from the call processing section 22. When such a command is received in the input-output section 21, a command in progress signal is provided to the timing circuit 301, FIG. 3, by the data control 203, thus stopping the current scan cycle. The data control 203 may then be interrupted to interrogate the various data trunks, et cetera. When the command has been executed, the digit control 210 is reactivated. A command executed signal is transmitted to the timing circuit 301 for this purpose.

The memory register access circuit 302 places a digit in the data and digit store 204 via the memory register set and reset circuit 303 and the memory register 411 in data control 203.

For many applications it is necessary to reset certain digits in the store 204. The memory register set and reset circuit 303 is used for this purpose. It serves as a common point for all the resets of the various positions in the memory register 411 of the data control 203. It also provides for common inputs to the set sides of these various memory register positions.

The digit completed register enable circuit 304 is used to steer the previously stored digits from the store 204 to the digit completed register 310. One of a plurality of enable leads in the digit completed register enable circuit 304 will be active, dependent upon the type of call being initiated and the code established in the control register 308 concerning the message status.

The digit receiver 209 provides the digit control 210 with a combination of possible frequencies each time that a digit is present. These frequencies serve as inputs to the translator 305 which then converts them into a 4 digit binary code in a manner well known in the art. Another function of the translator 305 is the detection by suitable logic circuitry of the receipt of a multifrequency digit. The outputs of the translator 305 are directed to the memory register access circuit 302 for subsequent transfer to the memory register 411 of the data control 203.

The receiver status circuit 306 comprises a flip-flop which is set by the call processing section 22 whenever heavy traffic conditions occur. The outputs of this flip-flop are utilized to provide either a long or short time-out of the dial tone for an interdigital interval.

The receiver number comparator 307 serves to compare the digit receiver number provided by the call processing section 22 with the number of the digit receiver 209 which may be contained in the receiver number register 314. For this purpose the enable circuit 304 activates the receiver number register 314 to transmit its content to the receiver number comparator 307 and, if a valid comparison is indicated by comparator 307, it will in turn activate the digit completed logic 315.

The control register 308 provides a temporary memory for both the digit control 210 and the sender control 211. The flip-flop registers contained therein are set when the appropriate words are read from the data and digit store 204 by the data control 203 and remain set until a predetermined point in the scan of each digit receiver.

The digit control logic 309 comprises suitable logic circuitry as known in the art for maintaining a record of all calls being processed and updating this record as required. It handles both the rotary dial and multifrequency type of calls.

As indicated hereinbefore, the digit completed register 310 receives the completely registered digits from the data and digit store 204. It receives its inputs from the reset sides of the memory register 411 in the data control 203 when activated by the digit completed register enable circuit 304. Its outputs in turn are directed to the call processing section 22.

The digit completed logic 315 facilitates the transfer of the digits as stored in the digit completed register 310 to the call processing section 22. This is accomplished upon receipt of a command and subsequent to the comparison performed in the receiver number comparator 307 between the receiver number as contained in the receiver number register 314 and the number being provided with the command.

The steering circuit 311, as its name indicates, acts under control of the incoming digit position count contained in the first word of the digit receiver storage area to steer the incoming digits into their appropriate positions in the digit words.

The outputs of the memory register access circuit 302 serve as inputs to the digit decoder 313, which pretranslates the first received digit to determine the type of call being processed. The outputs from the digit decoder 313 are directed to the digit control logic 309 to establish the message status as recorded in the first word of the corresponding digit receiver storage area in the data and digit store 204.

When a number is placed in the digit completed register 310, its address is placed simultaneously in the receiver number register 314 by the address register 404 in the data control 203. It also serves to inform the balance of the digit control 210 that no new digits can be received until the currently stored digits are removed from the data and digit store 204 and the storage area made idle.

b—*Digit control operation*

When dial tone is provided by a digit receiver 209, it appears in the digit control logic 309, together with a signal from the timing circuit 301 when the data and digit store 204 is being addressed to the first word of the corresponding digit receiver storage area. The logic 309 would normally generate an inhibit-write signal at this time because the idle condition is recorded in the aforesaid first word. This condition is indicated by an input to the logic 309 from the idle indication stored in the control register 308.

In the next time interval, the content of the first word is read into the control register 308. At this time, the digit control logic 309 provides an output to the memory register set and reset circuit 303 which serves to set a distinct stage in the memory register 411 which will permit the idle indication to be removed the next time this digit receiver storage area is sampled. No further action involving the digit control 210 is undertaken in the current scanning cycle.

In the next scanning cycle, should dial tone still be generated by the digit receiver, the idle condition would now be absent. Thus when the second word in the corresponding digit receiver storage area is being read, the digit control logic 309 enables a counter included in the memory register 411 of the data control 203 through the adder circuit 408. This is for the purpose of providing a time-out count on dial tone for this particular digit receiver. Therefore, each time this digit receiver is sampled and dial tone is still present, a count of one will be added to the second word of the corresponding digit receiver storage area in the data and digit store 204.

Subsequently, one of three possible conditions might occur: The first condition is a reset signal from the digit receiver, indicating that the calling line is no longer active. This reset signal would appear in the digit control logic 309 and would direct the clearing of the corresponding digit receiver storage area through the command and transfer logic 403 of the data control 203.

The second condition which might occur would be a time-out. If the first digit is not received within a predetermined time interval, a time-out flip-flop in the control register 308 will be set; whereupon, two situations may prevail, dependent upon the busy-idle status of the digits completed register 310. First, if the register 310 is busy, the digit control logic 309 will instruct the instant digit receiver to mark time until the register 310 become idle. Second, when the register 310 does become idle, the logic 309 will reset the idle indication in the first word of the corresponding digit receiver storage area. The logic 309 will also set the digit completed register enable circuit 304 to allow the content of the address register 404 in the data control 203, containing the number of the digit receiver being sampled, to be transferred to the receiver number register 314. At the same time, the digit completed register 310 will generate an indication of this condition in response to an input from the digit control logic 309.

The third condition which might occur is receipt of the first digit prior to a time-out or a reset. In this situation, the digit receiver 209 will activate the digit control logic 309 when the first word in the corresponding digit receiver storage area is being addressed. Also the logic 309 will receive an indication from the control register 308 that no prior digit has been received on this call. In addition, the translator 305 provides a signal indicating that the digits being received are of the multifrequency type.

An output from logic 309 resulting from these input conditions will set the control register 308 to indicate that the calling line is supplying multifrequency digits, so that the digit currently being received may be placed immediately in its assigned position in the store 204 through the memory register set and reset circuit 303. Thus the output from control register 308 sets the appropriate indications of multifrequency and busy conditions in the first word of the corresponding digit receiver storage area. The control register 308 also sends this output indication through the adder 408 of the digit control 203 to advance the counter section contained in the first word of the corresponding digit receiver storage area. The setting of the multifrequency and busy indications prevents double sampling of the same digit during the next scan of the corresponding digit receiver.

The digit decoder 313 also provides inputs to the logic 309, serving to enable specific gates therein as determined by the first digit indicating a 1, 2 or 3 digit message. If a 1 digit type message is being received, the timing circuit 301 and the control register 308 will activate the logic 309 during the addressing of the second word in the digit receiver storage area to provide an output which resets the digits of the second word, thus clearing the dial tone time-out count. Also during the scan of the second word and during the receipt of the first digit, the logic 309 is enabled by the all zero count status of a counter in the control register 308. If the first digit is an 8 or a 9, the digit decoder 313 activates the logic 309 at the appropriate time, determined by the timing circuit 301, to set the class of information indication in the second word of the digit receiver storage area. No action takes place while the third word in the storage area is addressed. During action on the fourth word, however, the logic 309 is activated by the timing circuit 301 and the translator 305 to set the address of the first digit word of the eight word digit receiver storage area in the address register 404. While this first digit word is being addressed, the incoming digit is placed in the first four positions of this word, since each digit word is arranged to accommodate four digits, each requiring four storage positions.

Gates in the logic 309 receive the digit in coded form and arrange for its placement in the four distinct positions allotted to this particular digit. The outputs of these gates are applied to the digits completed register enable circuit 304, which in turn is enabled by the zero condition of the incoming digit position counter in the first word of the digit receiver storage area to reset the particular stages of the memory register set and reset circuit 303 corresponding to the four positions allotted to the received digit in the first digit word. In this fashion the four positions assigned to the received digit in the first digit word are reset prior to placing the new digit in the data and digit store 204. The output of the digits completed register enable circuit 304 thereupon enables the memory register access circuit 302 to permit the output of the translator 305, representing the received first digit, to be stored in the proper area of the store 204 via the memory register 411.

During the time that the first word in the digit receiver storage area was addressed and the translator 305 was enabled, the indication that the first digit was ready for transfer to the digits completed register 310 was set in the control register 308. Thus on a subsequent scan of this digit receiver storage area, the logic 309 is activated so as to reset the transfer indication in the first word of the digit receiver storage area. During address of the second word, the logic 309 generates an inhibit-write signal to the first word, directing it to erase this digit receiver storage area, provided that the first digit representing a 1 digit type call, viz., not an 8 or a 9, was received. The digit receiver also is made idle.

During the time that the fourth word is being read, the logic 309 is activated to step the store address counter 407 to the fifth word assigned to this digit receiver. The digit completed register enable circuit 304 is activated and its output enables the receiver number register 314 to receive the address of the digit receiver from the store address counter 407. Enable circuit 304, in concert with control register 308, also provides an enabling signal to the digit completed register 310, permitting it to receive the contents of the memory register 411 representing the first digit designating the called line. Subsequently, this information is transferred from the digit completed register 310 to the call processing section 22 on receipt of an appropriate command.

During the time that the fifth word, allocated to storage of the first four digits designating the called line, would be addressed, the first word of the digit receiver storage area is read instead, inasmuch as the sender control 211 was not called into operation. At this time, the output of the digit control logic 309 provides an inhibit-write signal to the store 204. If the first digit had been other than a 9, the storage area would be cleared in this fashion. However, if the first digit was a 9, the storage area would be cleared subsequently either because of a time-out on an extended interdigital interval or by the sender control 211 being called into operation on this type of call.

A call from one switch unit via a tie trunk to another switch unit is designated a 2-digit type call, designating the number of digits transferred to the program control 220 by the digit control 210. As in the case of a 1-digit type call, the digit control 210 performs a pretranslation function on the first digit to determine the number of remaining digits to be received prior to the transfer to the program control 220. The 2-digit type multifrequency message thus is handled in the manner described for the 1-digit type except that during the time the first word is being addressed, the digit control logic 309 sets one of the two message identification positions to identify the call as the 2-digit type. Following this, the first of the two digits received will be placed in the first digit storage position of the fifth word in the digit receiver storage area. No transfer to the digit completed register 310 will be made when the start signal from the digit receiver is removed, indicating completion of the digit transmission. The logic 309 resets the make and break indication areas in the first word via the memory register reset 303, such activity only being recorded for dialed digits. Thereafter, each time the second word is addressed, the logic 309 serves to add one to the counter portion of the memory register 411 for purposes of timing on interdigital intervals.

When the second digit is received, the logic 309, together with the control register 308, acts to set the transfer indication in the first word of the digit receiver storage area. Also during the time that the second word is addressed, the timing indication on the interdigital interval is reset. Again during the fourth word address, the logic 309 sets the store address counter 407 to the address of the fifth word, during which address the logic 309 activates the digits completed register enable circuit 304. Because the incoming digit position count indication is at 1, the enable circuit 304 resets the appropriate digit storage positions of the fifth word through the memory register access circuit 302, thus placing the second digit as received from the translator 305 in the appropriate positions of the fifth word.

Since the transfer indication is now set, the routine described for transferring the message received on a 1-digit type call to the digit completed register 310 is repeated. However, since the 2-digit type call indication is also set, the enable circuit 304 sets the digit completed register 310 to receive the first two digits now contained in the fifth word of the digit receiver storage area. If the first digit was not 8, the digit receiver storage area would be cleared at this time, as described in regard to the 1-digit type call. However, if the first digit was an 8, the area will remain busy pending receipt of a time-out during an extended interdigital interval or a signal from the sender control 211 upon completion of the outpulsing operation.

When the first digit of a 3-digit type call is received, the logic 309 will set the type of call indications in the first word of the corresponding digit receiver storage area so as to reflect this condition. The first two digits are received in like manner to that described for 1 and 2 digit type calls. Upon receipt of the third digit, the logic 309 sets the transfer indication in the memory register 411 for subsequent storage in the first word of the digit receiver storage area. The third digit is then placed in the appropriate position in the fifth word of the digit receiver storage area. The three digits are now ready for transfer to the digit completed register 310. Therefore, when the digit completed register 310 becomes idle and the start signal is received from the digit receiver, indicating completion of digit transmission, enable circuit 304 activates the register 310 so as to receive the three digits from the store 204.

If the first digit is a 9, it is necessary to transfer the second, third and fourth digits to the program control 220 upon receipt of the fourth digit. This transfer is also performed via the digit completed register 310. Thus while the fourth digit is being received, the control register 308 sets the toll diversion transfer indication in the second word of the digit receiver storage area via the memory register set circuit 303 and the memory register 411. Thereafter, when the digit completed register 310 is available, the digit control 210 will recognize the presence of the toll diversion transfer indication in the digit receiver storage area and will act during the address of the fifth word to transfer the four digits contained therein to the register 310.

As previously indicated, a particular output of the translator 305 represents a digit of the rotary dial type, the dial tone routine on a rotary dial type call being identical to that described for the multifrequency type call. Therefore, distinctions are evident only upon receipt of the start signal from the digit receiver following dial tone. In this instance the digit decoder 313 informs the logic 309 that the first pulse received is of the rotary dial type, permitting it to set the break indication in the first word of the corresponding digit receiver storage area via the memory register set and reset 303. It also resets the interdigital interval indication in the first word. Positions in the first word area allocated for the storage of the dial pulse count for the digit currently being received. Thus the logic 309 enables the adder 408 in the data control 203 to update this count upon the receipt of each pulse.

Since the interval between successive scans of the same digit receiver is much shorter than the make or break interval for a dial pulse, it is necessary that the digit receiver be ignored on successive scans subsequent to registration of a particular make or break indication until a change of state is indicated by the presence or absence of the start signal. When the start signal changes, indicating the presence of a make interval, the logic 309 resets the break indication and sets the make indication in the first word via the memory register set and reset 303. Then, during address of the second word, a timing operation is initiated for recognition of an interdigital interval or of a time-out condition, should the dialing operation not be completed. For this purpose the logic 309 enables the counter in the memory register 411 to begin timing this interdigital interval. Should the start signal change again, prior to a predetermined count representing the interdigital interval, the logic 309 acts to set the break indication, reset the make indication, and update the dialed digit count indication to record the receipt of a second dial pulse. This operation continues so long as time-out or an interdigital interval does not occur prior to a change in the starting signal. In this fashion a digit is recorded in the dial digit count section of the first word of this digit receiver storage area.

When the interdigital interval is indicated, the receiver status circuit 306 serves as a temporary memory to store this indication until the fifth word of this digit receiver storage area is addressed. Then, during the fifth word address time, the first word is interrogated and the interdigital interval indication is set. Thus on a subsequent scan, when this indication in the first word is recognized, the logic 309 updates the incoming digit position count contained in the first word via the adder 408 in the data control 203. Subsequently, the content of the dial digit count section is gated from the control register 308 to the digit decoder 313 where the count is decoded to determine the number of digits which can be expected, as well as the type of call being placed. The remaining digits are processed in a manner similar to that described for multifrequency type calls.

Transfer of the content of the digit completed register 310 to the program control 220 occurs upon receipt of an appropriate command from the call processing section 22, together with the address of the particular digit receiver, as contained in the receiver number register 314. Comparison circuit 307 compares the address in the receiver number register 314 with that provided by the program control 220 or its duplicate, as determined by the maintenance center 224. A signal indicating a match is provided to the temporary receiver register 312 and to the digit completed logic 315 which serves as a memory for later clearing of the digit completed register 310 and the receiver number register 314 upon receipt of the transfer command.

Should the digit completed register 310 contain a message but no command for transfer to the call processing section 22 is forthcoming, the register is cleared after a predetermined length of time by another command transmitted through the digit completed logic 315 after completion of the scanning routine in the call processing section 22. The output of the digit completed logic 315 resets registers 310 and 314, as accomplished by the earlier command, for transfer of a message.

7—*Sender control 211* (*FIG. 7*)

When a call requires outdialing, i.e., the called party is not associated with the same switch unit as the calling party and must be reached via a trunk to the central office or a tie trunk to another PBX, the center control 211 is activated. It receives and registers commands from the call processing section of the control unit 20 concerning the switch unit and trunk circuit to be served and also the particular digit receiver 209 processing the digits designating the called line. Thereafter, it inserts such new information into areas of the data and digit store 204 allocated for this purpose and corresponding to the particular digit receiver 209 involved. Subsequently, the sender control 211 utilizes the stored information to construct pulses to be transmitted through one of the trunks 213, to determine by translation of the first few digits of the outgoing number precisely how many digits are to be outpulsed, and to terminate the outpulsing operation.

The trunks 213 are of a conventional type with the exception that control is provided at an intermediate point in the trunk rather than at its transmission terminals. Such control permits outpulsing from the control unit 20 which may be isolated from the location of either of the calling or called parties and thereby permits calling parties at the switch unit 10 to dial a called line remote from the switch unit 10 without requiring the services of the attendant.

The trunk connector 212 is the connecting link between the trunk circuits 213 and the sender control 211. It comprises conventional translating circuitry arranged to translate an address provided by the call processing section or the sender control 211 into a code suitable for location and seizure or release of a particular one of the trunk circuits 213. A suitable timing circuit operating in conjunction with the system clock and a distribution circuit are also provided, the latter circuit containing conventional logic elements.

As in other control circuits of the input-output section 21, the sender control 211 comprises conventional AND or OR logic circuits, flip-flops, shift registers and counters operating in appropriate time intervals determined by the system clock.

Pursuant to the placement of a call to a party outside the switch unit 10, the calling party will designate this destination as the first digit of the called line code. Upon receive of this digit by the control unit 20 and its subsequent processing, the call processing section 22 will alert the sender control 211 that the incoming digits will require outpulsing. As indicated previously, on normal connections appropriate designations of the calling and called lines will be stored in the data and digit store 204, and subsequently such data is retrieved from the store and outpulsed by transmitting operate and release information to the trunk connector 212, which then proceeds to operate and release a relay in the assigned trunk circuit 213 in a corresponding pattern.

In certain instances the calling party need only dial a predetermined number of digits less than the full directory number of the called party. In such compressed dialing instances, the additional digits required to fully define the called line are supplied by the call processing section 22. Thus the sender control 211 will receive the same amount of information concerning the called line except that an appropriate status indication is also provided. Upon receipt of such an indication, the sender control 211 will interrupt the normal scan of the data and digit store 204 in order to address the specific area concerned with the compressed dialing call, at which time the call processing section is permitted to store the additional information therein. Outpulsing then proceeds in the normal manner.

The sender control 211 is arranged so as to recognize the last digit to be outpulsed, whereupon outpulsing is terminated. This is accomplished for calls other than the compressed dialing type by observation of the digit prefix designating the called line which is stored in the sender control 211 for this purpose. An indication of this prefix digit is given to the digit control 210 after outpulsing the last digit, thereby causing the assigned area of the data and digit store 204 to be cleared and appropriate information to be transferred to the call processing section. For compressed dialing calls, the information provided by the call processing section 22 is used to recognize the last digit to be outpulsed rather than the aforementioned digit prefix.

The sender control register 702 indicates a busy condition when it is prepared to receive information from the call processing section 22. It receives an indication from the maintenance center 224 in accordance with the particular program control 220 currently in use. The switch unit number, dial trunk number, status indication and digit receiver address, as provided by the selected program control 220, are then delivered to the sender control register 702. The register 702 is cleared after the information stored in it is used by the balance of the sender control 211.

On a routine call, the sender control 211 recognizes when the correct digit receiver storage area is being addressed and then loads into that area the switch unit number and dial trunk number as contained in the sender control register 702. When the digit receiver number stored in the register 702 agrees with the storage area in the data and digit store 204 being addressed, as determined from the address register 404 of the data control 203, and if the register 702 indicates this to be a routine call, the address comparator 701 is satisfied. Thereafter, when the fourth word of the digit receiver storage area is being addressed, the switch unit and trunk number contained in the register 702 are gated through the comparator 701 and memory access gate 705 into the memory register 411 where they are held until the register 702 is reset. They are then written into the store 204. It is possible for an interruption to occur when the comparator 701 is set. Such an interruption would cause the store 204 to address a data storage area; whereupon, a switch unit and trunk number would be loaded into such area and the sender control register 702 and comparator 701 reset.

On a compressed dialing call, a command 220 to load the outgoing digits in the sender will interrupt the data store scan cycle and cause the sender control 211 to address the digit reciever storage area corresponding to the digit address in the register 702. The words in the digit receiver storage area are then addressed in a predetermined sequence to satisfy the command instructions.

The miscellaneous logic 703 performs several functions; for example, it indicates to the sender control 211 when the fourth word in the digit receiver storage area is being addressed. Also it assures that the outpulsing ready indication in the third word is set before the sender outpulses any digits. It also resets the sender control register 702 in the fourth word when the comparator 701 is set after the information in the register 702 has been used.

The memory access gates 705 serve to set information into the memory register 411 of the data control 203 and to reset the register 411 by way of the digit control 210, as required.

The digit position comparator 706 compares the incoming digit position and outgoing digit position when contained in the control register 308, a match indicating that all digits which were previously registered in the data store 204 have been outpulsed.

The pretranslator 704 interrogates stored digit words and sets up a code which is stored in the third word of the addressed digit receiver storage area. The translated code corresponding to each possible dialed prefix is then used by the sender control 211 to determine when all digits of a call have been outpulsed.

The outpulsing logic 703 acts upon the information stored in the third word of a digit receiver storage area to generate the outgoing digit timing sequence. The sender complete section of logic 703 uses the stored translated code to determine when the last digit has been outpulsed. This logic is then set and when a signal indicating that outpulsing is definitely completed has been received, it provides an output signal.

Finally, on a compressed dialing call, the required digits must be transferred from the call processing section 22 to the digit receiver storage area. The incoming digit gating 707 provides a path for this purpose, as determined by the maintenance center 224, considering which program control 220 is in use. All of the digit gates are enabled at a predetermined time when a digit word is being addressed during a command to load the sender for outpulsing digits. Thus, upon command from either program control 220, the digit information is gated by the incoming digit gating 707 from the program control 220 through the memory access gates 705 into the memory register 411.

*B—Call processing section 22 (FIGS. 5, 6, 8–13)*

Whereas the input-output section 21 is arranged to monitor active and prospective calls in each of the remote switch units 10–*n* concurrently, the call processing section 22, FIG. 2, processes a single call at a time. Processing of any one call involves a number of steps as the connection is being established and disestablished. The call processing section 22 maintains a record of each of these steps in the processing of a call, thus keeping itself currently advised as to the status of every call in the system.

The status of each call is observed periodically and compared with information received from the input-output section 21 so as to maintain a current status record for each call, the recorded status being updated upon receipt of each new condition report as the temporary record is observed. Such call status records are maintained in the call status control 222, one of the three major units in the call processing section.

A second major unit is the program control 220. The record of each call maintained in the call status control 222 contains a distinct indication as to the current state of a call indicative of the progress made to date in the establishment of the connection. As the status of each call is observed, this call status indication or progress mark is transmitted to the program control 220 where it is utilized to address a storage unit designated the program store 221. Such action triggers the program store 221 to provide a chain of commands to equipment throughout the call processing section 22 which eventually serves to update the information contained in the call status control 222 and, in some instances, to provide operating instructions to the input-output section 21 in order to permit implementation of the actual call connections in the remote switch units 10–*n*.

Thus the call processing section 22 may be said to operate in accordance with a stored program. The primary characteristic of such program controlled system operations is the utilization of a program or series of commands permanently stored in the system, which commands are carried out by the system on a selective basis in accordance with instructions to the program in the form of addresses, each distinct address initiating a distinct series of commands.

The third major unit in the call processing section is the line information control 223, which contains information concerning each line and trunk in the entire system, ancillary matters such as class of service to which a particular line is entitled, abbreviated directory numbers, toll call diversion, compressed outpulsing translations, et cetera. Such information is available upon request by the program control 220 as desired in the processing of a particular call. When interrogated, the line information control 223 will deliver information ot the call status control 222, where further processing of the call will take place.

The call processing section 22 systematically interrogates the input-output section 21 for new information concerning a particular call that it is currently processing, such information including on- or off-hook messages, digit pulsing completed, et cetera. Following the instructions contained in the program store 221, the call processing section 22 interprets data received from the switch unit originating the particular call being processed, as temporarily stored in the input-output section 21, and subsequently informs the same switch unit via the input-output section 21 as to which connections to establish or disestablish in order to satisfy any indicated change of status in the instant call. The call processing operation thus may be seen to comprise collecting information from the switch units, comparing such information with the current recorded status of a call, and advising the switch units to take appropriate action while updating the status of the call, each operation being under the control of instructions received from a stored program.

Figure 11:
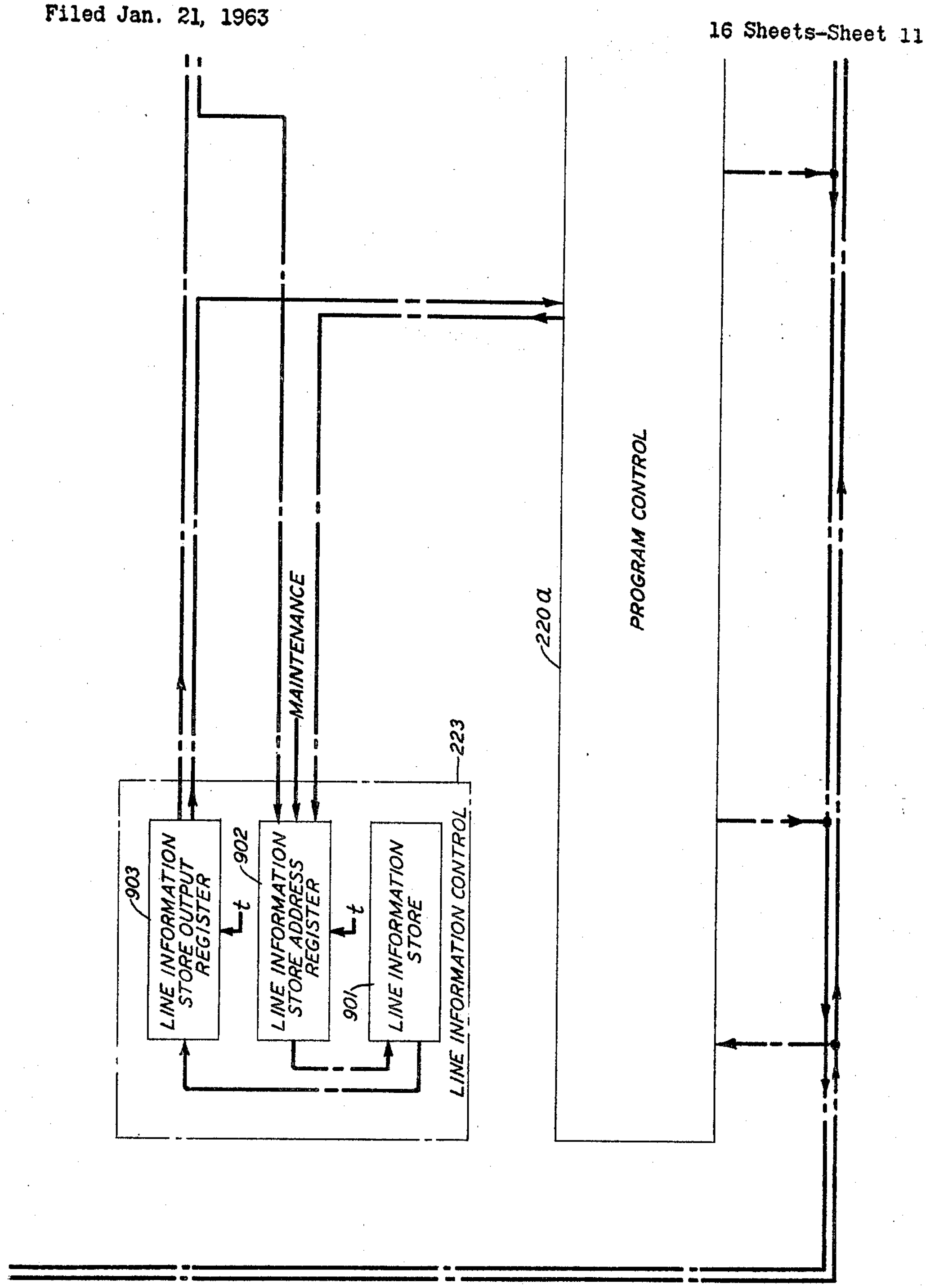
Figure 12:
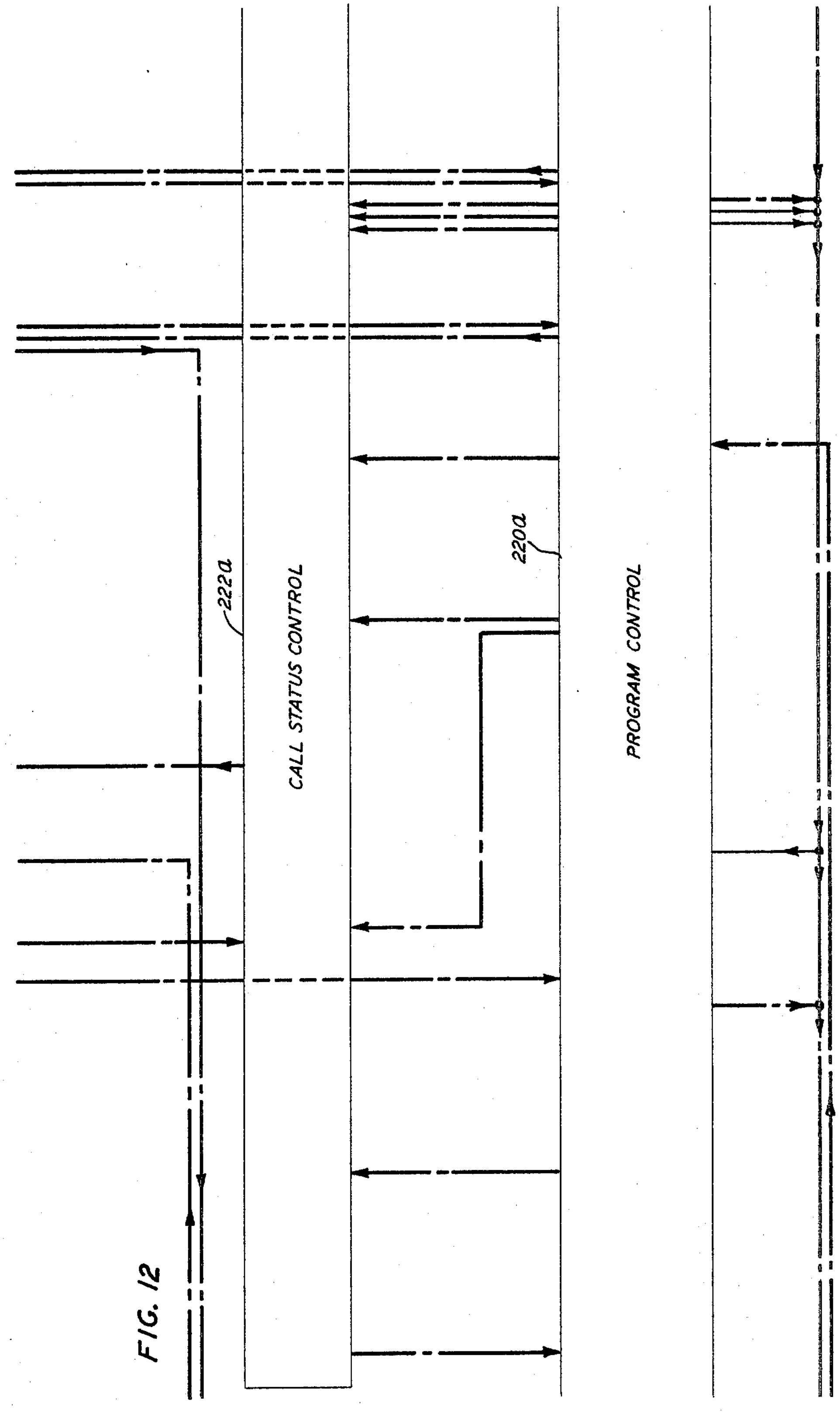
Figure 13:
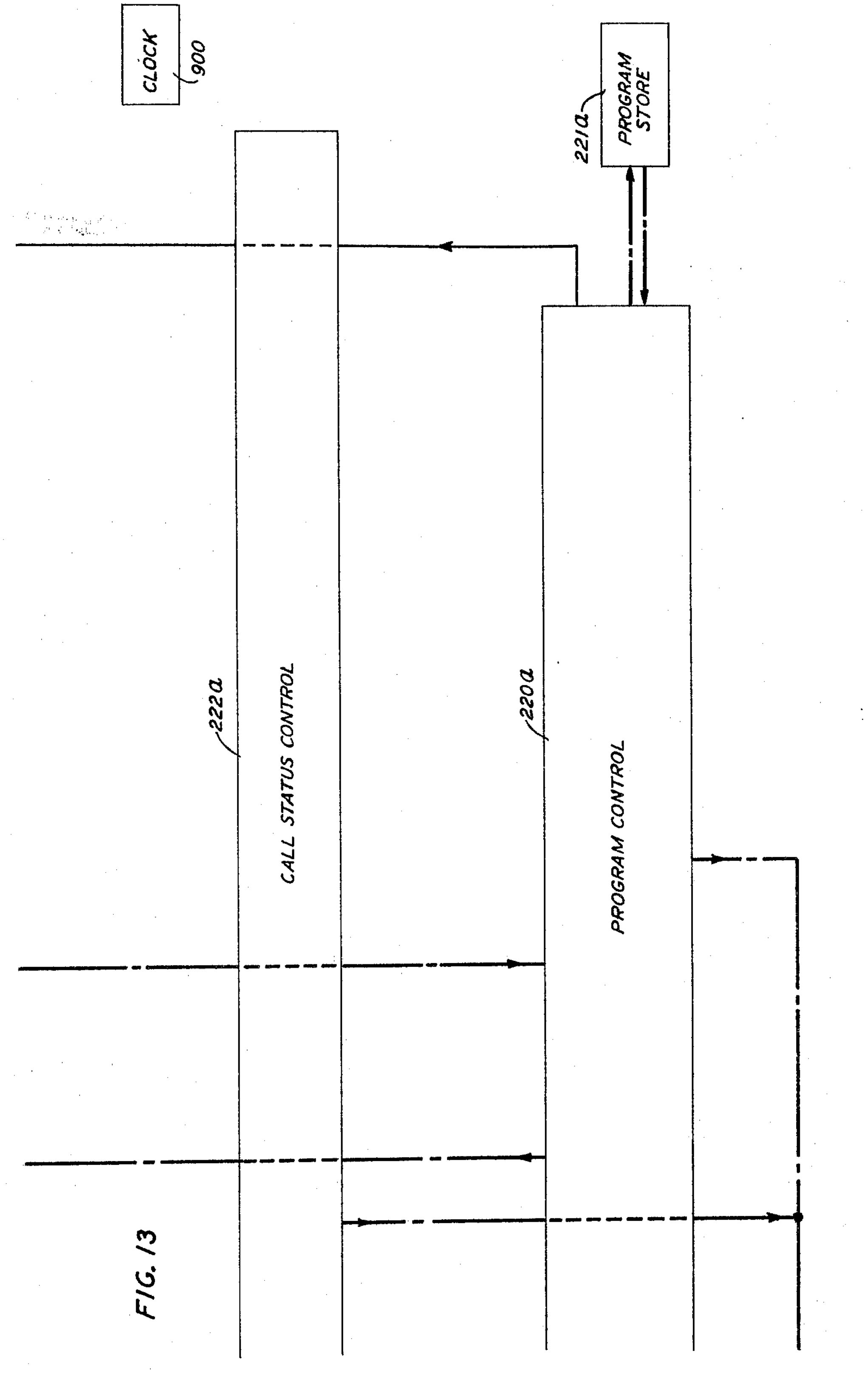

For purposes of reliability, the call status control 222 and the program control 220 are duplicated, as indicated by corresponding units 222*a* and 220*a*, FIGS. 11 through 13. While one pair of these units is in an active condition, the duplicate pair is in a standby condition, with their operations interchangeable upon evidence of some failure in the active units. The unique manner of information interchange will be discussed in detail hereinafter. The line information control 223 is not duplicated. If a failure should occur in this unit, certain system services would be curtailed. However, in such an eventuality, the system may be programed so that customers in the remote switch units will be unaware of the occurrence of a failure, and in no instance will the basic telephone service be restricted by such a failure.

Each of the major units of the call processing section will now be considered in more detail with reference to FIGS. 3 through 10, after which the operation will be examined as it is used in the processing of an actual call through the system.

Figure 5:
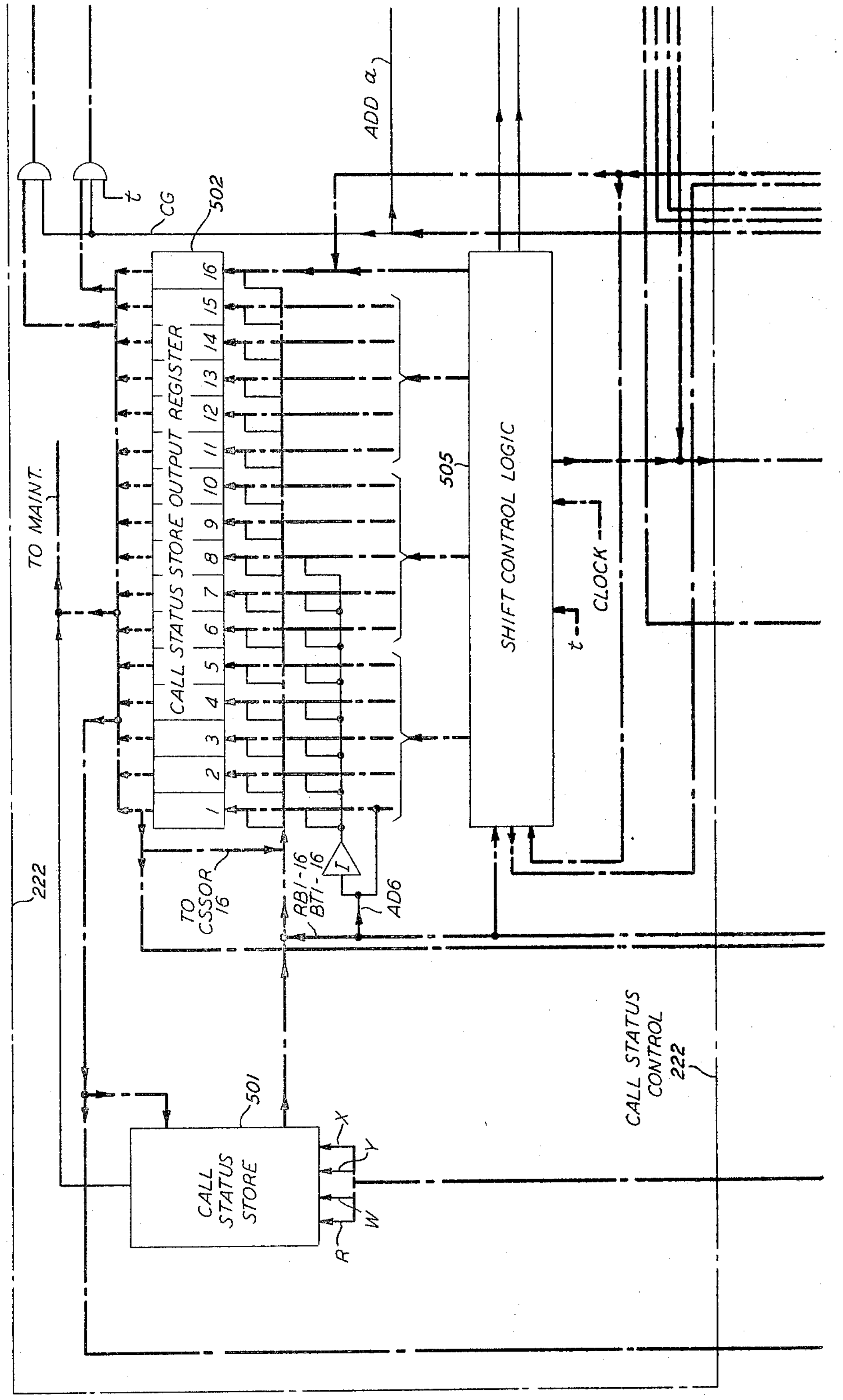
Figure 6:
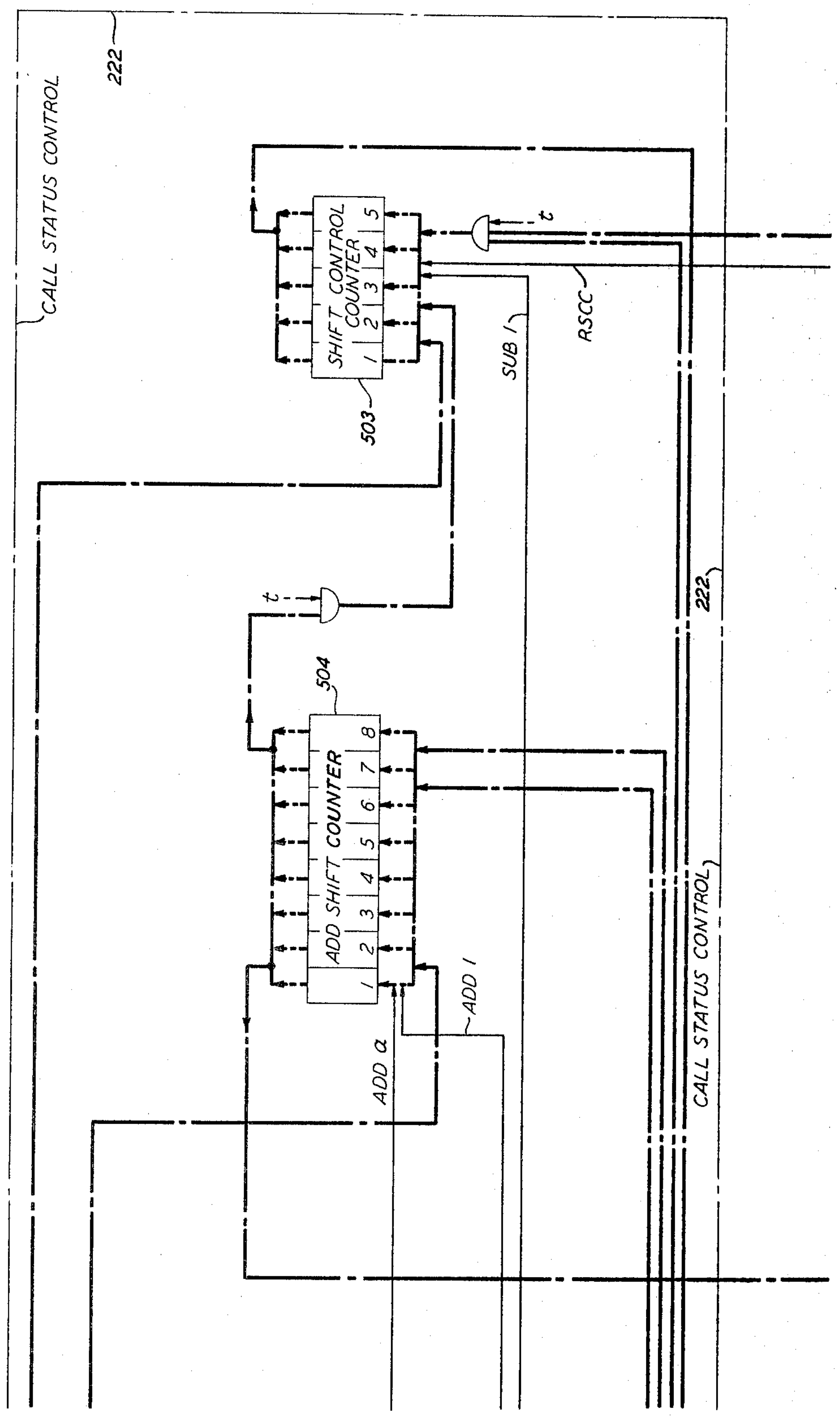
Figure 17:
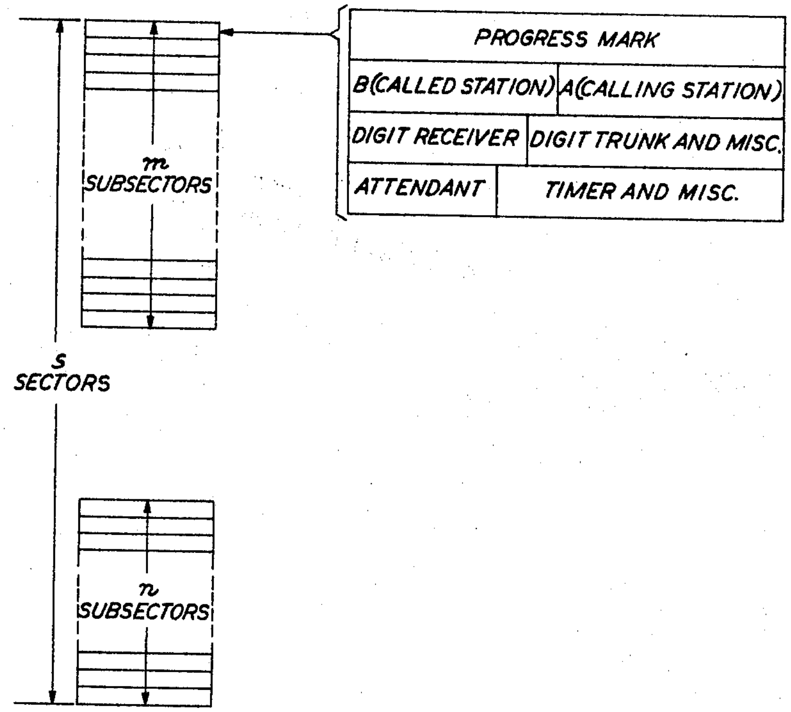
Figure 18:
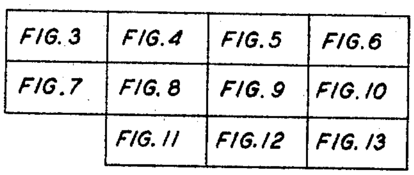
FIG. 18 is a key chart representation of the arrangement of FIGS. 3 through 13.

1—*Call status control 222* (*FIGS. 5, 6 and 17*)

The call status control 222 is illustrated in FIGS. 5 and 6. It includes a call status store 501, FIG. 5, which advantageously comprises a ferrite sheet memory similar to the data and digit store 204 in the input-output section 21. This contains the temporary information concerning the current status of each call or prospective call through the system. The information is arranged in the store in such a manner, FIG. 17, that the status of each call may be observed in sequence in a recurring cycle. To facilitate such observation, a distinct portion of the store is allotted to each of the remote switch units in the system, depending upon the traffic requirements, encountered in the respective switch units. Each such portion or sector thus may not correspond in capacity to any other sector in the store. The sectors in turn are subdivided into subsectors of four words each, there being a four-word subsector corresponding to each time slot in a particular switch unit. Such four-word subsectors serve to record all the necessary information as to the current status of a call. This arrangement of the call status store 501 is similar to that illustrated in the aforementioned Gebhardt et al. patent. Included in each subsector is the progress mark which, upon interrogation, serves to apprise the call processing section 22 of the current state of the call being handled by the switch unit in the time slot corresponding to the subsector in which it is found. If there is no call in this subsector, the progress mark is zero. It is the progress mark which governs the subsequent operation of the call processing section 22 by initiating interrogation of the stored program.

Also included in the four-word subsector pertaining to a particular call is the identity of the calling and called stations, if known, the digit receiver and trunk assigned to the call, if any, plus miscellaneous control information involving the services of an attendant at the remote switch unit and various timing operations. Depending upon the state of a particular call, some or all of this information may be contained in a given subsector.

Generally, the operation of the call status store 501 is as follows: A progress mark is read from a particular subsector of the store and transmitted to the program control 220 where it initiates a distinct stored program sequence for processing the call. If this sequence is of such a nature as to change the status of the call, appropriate information is added to or deleted from the corresponding subsector of the store 501 and a new progress mark is inserted. Upon completing the interrogation of a particular subsector, the progress mark contained in the next subsector is read and the sequence repeated. After all subsectors have been investigated in sequence, the cycle is repeated.

In addition, distinct programs are available, one being initiated at the beginning of each sector and another at the end of each sector. Thus, as a particular sector of the store 501, corresponding to a particular switch unit, is reached in the sequence, the beginning of sector scan routine is initiated. It interrogates the data control 203 in the input-output section 21 for new input data from the corresponding switch unit, such as a line changing from the idle to the active state. It retrieves such originating messages from the data and digit store 204, classifying the messages as pertaining to extensions, trunks, attendants, or maintenance facilities. During the ensuing sector scan, the new input message is compared with active numbers which are recorded in the call status subsectors. At the same time all active calls recorded in the subsectors are updated as required.

Upon completion of the sector scan, the special end of sector scan routine is initiated to determine whether or not a match was obtained between the new information and the previously recorded information. If no match is indicated, a new request for service is assumed. The end of sector scan routine is then responsible for the location of an idle time slot for use by this call, an idle digit trunk 207 to the originating switch unit, and an idle digit receiver. It thereupon serves to interconnect the assigned digit receiver and digit trunk in the input-output section 21. In addition, it records in the subsector corresponding to the selected time slot the numbers indicative of the calling line, the assigned digit trunk and the assigned digit receiver. Finally, it provides for the placement of the appropriate progress mark in the assigned subsector indicating that the control unit is prepared to receive digits from the calling line indicative of the called line.

Concurrently, dial tone is provided to the calling line by the assigned digit receiver. If, for any reason, any of the above assignments are not possible in the current allotted interval, the calling line designation is placed in a top priority call waiting status and the assignment sequence is repeated during succeeding sector scans until successful, at which time dial tone will be provided.

Information read out of the call status store 501 is placed in the call status store output register 502. The register 502 serves as a central accumulator for the system. Most of the operations performed by the stored programs involve this register in some way. It is a conventional shift register as known in the art which, upon command from the program control 220, is capable of performing many functions, e.g., shifting its content either to the right or to the left or altering its content by the addition of a single bit.

As indicated heretofore, the call status control 222 and the program control 220 are duplicated for reliability purposes, as illustrated by the corresponding control circuits 222*a* and 220*a* in FIGS. 11 through 13. In the normal operating routines of the system, the duplicated circuits operate independently, with one or the other of the identical stored programs in control of the system operation at any given time. However, only the active call status store 501 contains the current call status information, while the other call status store merely contains a skeleton record of the calls plus information essential to performance of various supervisory functions required to process certain types of calls. The call status store output register 502 is required to perform an interchange of all the stored information between the active call status store 501 and the corresponding store in the call status control 222*a* whenever certain types of failures are encountered or it is desired to perform routine maintenance tests. A particular command forwarded to the call status control 222 by the program control 220 initiates the interchange of information. Pursuant to such an interchange, the content of each subsector in the call status store 222 is read into the output register 502 in sequence. Similar operations are performed concurrently in the duplicate call status control 222*a*. Thereafter, upon receipt of an appropriate command in the current program, the contents of the output register 502 and its counterpart are interchanged and the new information written in the appropriate corresponding call status store.

The interchange of information may be initiated by either of the duplicated program controls 220 or 220*a*. If the program store such as 221 which is currently in control of the system should fail, the system will automatically transfer to the duplicated program store in the program control 220*a*, which store will then supervise the interchange of information between the call status stores and thereafter assume the responsibility for processing of calls.

In addition to the ability of the call status store output register 502 to shift information to the right or to the left or to the duplicated output register in the call status control 222*a*, the first eight stages form a counter circuit which may be incremented. With this flexibility, the call status store output register 502 serves as the common gating point in the call processing section 22. Thus all information received from the input-output section 21 for processing will be transmitted through the register 502 at some point so as to be exposed to the commands also received by the register 502 from the program store 221. Similarly, final orders to the balance of the system as to actions to be taken to implement a particular call will pass through the register 502.

Various other circuits in the call status control 222 assist the output register 502 in the performance of its central gating function. The shift control counter 503 is a conventional counter, as known in the art, which serves to limit the length of shift accomplished in the output register 502 either to the right or to the left. For this purpose, a command from the program control 220 for the output register 502 to shift a specific number of stages, results in the storage of that number in the shift control counter 503. The shifting process is then implemented with the number stored in the shift control counter 503 reduced by one for each step shifted. The shift operation is concluded by a signal from the shift control counter 503 to the output register 502 when the counter 503 exhibits a zero content.

The add shift counter 504 operates in conjunction with the shift control counter 503 upon receipt of certain commands such that when the output register 502 is shifted to the right, the add shift counter 504 is incremented by one for each shift operation. At the same time the shift control counter 503 is decremented by one, as described heretofore. The shifting operation is terminated when the number in the shift control counter 503 reaches zero or the lowest order stage in the output register 502 contains a zero.

The output register 502 and the counters 503 and 504 are interconnected in such a manner that if the output register 502 does not contain a zero, the content of the counters 503 and 504 will be added, and the sum will appear in the counter 504. In this fashion the specific command to the output register 502 to shift its content until a zero bit is contained in the least significant stage may be utilized for the ancillary purpose of sequential addition. If any bit in the output register 502 is zero, the add shift counter 504 will identify the position in the output register 502 containing the first zero bit upon completion of the aforementioned operation whenever the shift control counter 503 is initially set to the maximum count corresponding to the number of stages in the output register 502. Thus, for example, the output register 502 illustrated in FIG. 5 has sixteen stages. When the shift to zero command is received with the shift control counter 503 initially containing the maximum count of sixteen, the add shift counter 504 will contain the number of the stage in the output register 502 in which the first zero appears when the shift operation has been completed. In this way an idle state, as indicated by the zero digit, is detected and the appropriate system selection function is performed.

The shift control logic 505 performs the various functions necessary for the operation of the output register 502 and counters 503 and 504. These functions include the recognition of commands, the gating and inhibiting of clock pulses in accordance with a given command, and the monitoring of the shift processes in order to detect when the desired length of shift has occurred. For these purposes the shift control logic 505 contains various logic circuits such as AND and OR gates and flip-flops, as well known in the art.

2—*Program control 220 (FIGS. 8, 9 and 10)*

Figure 8:
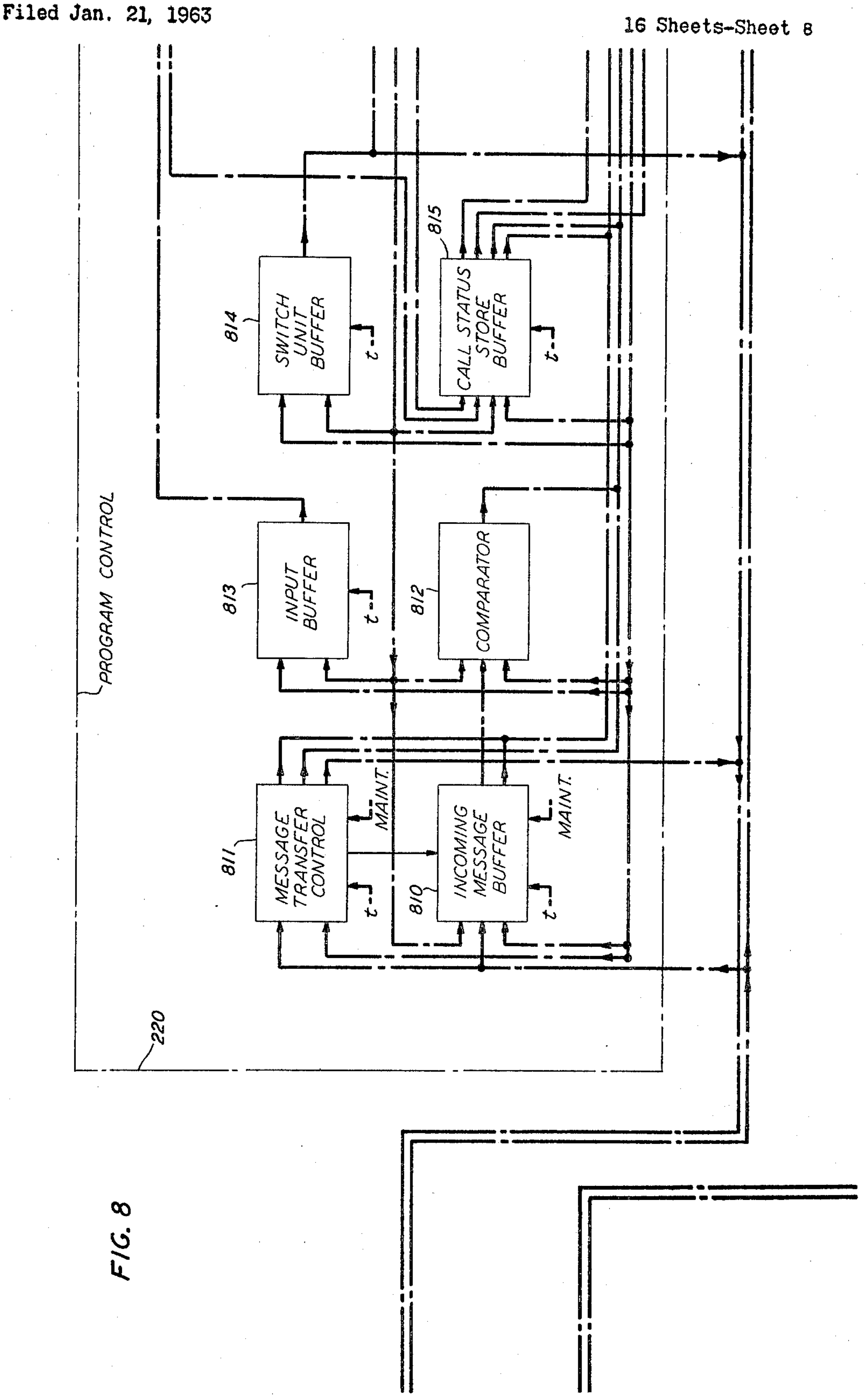
Figure 9:
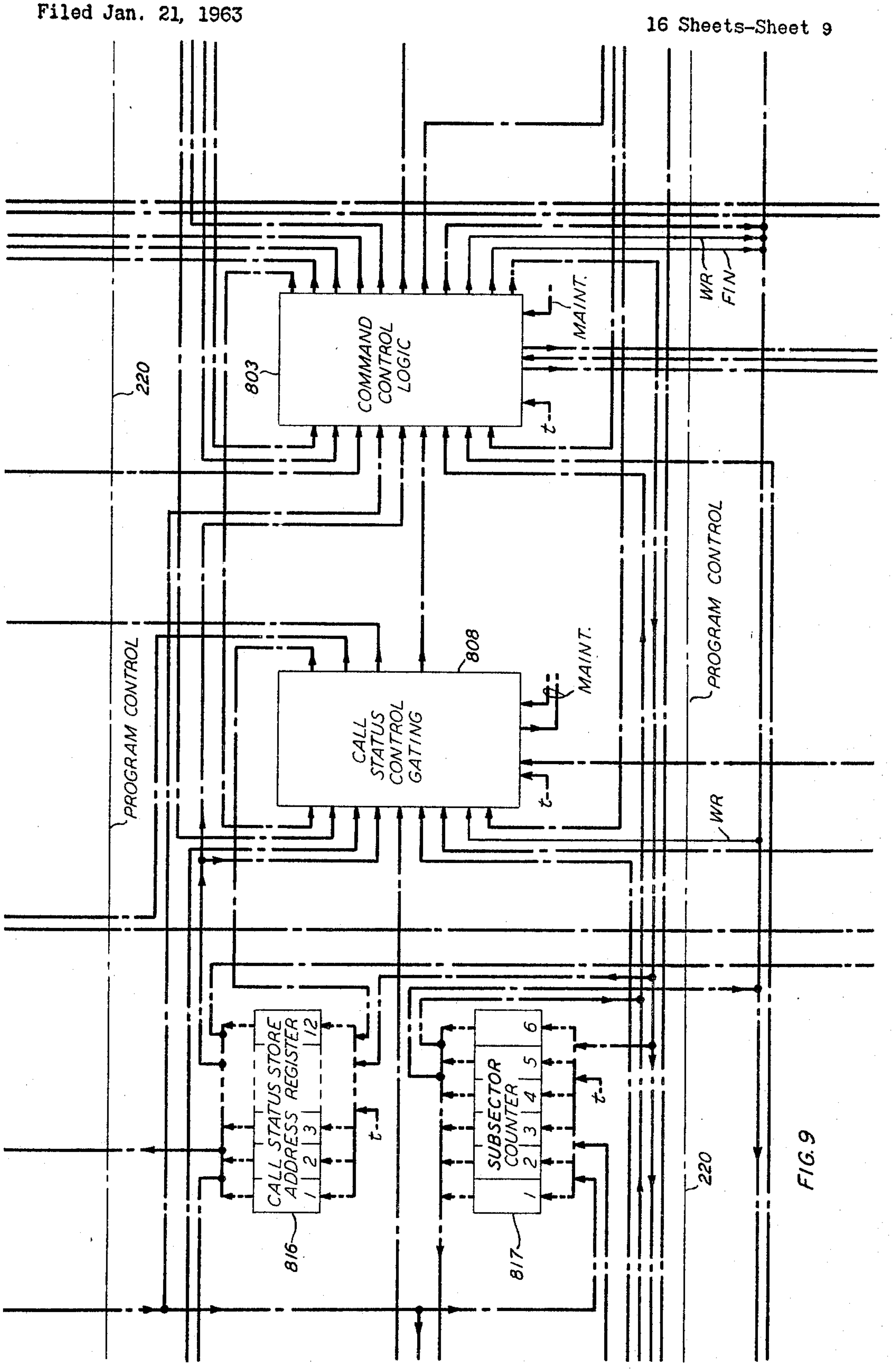
Figure 10:
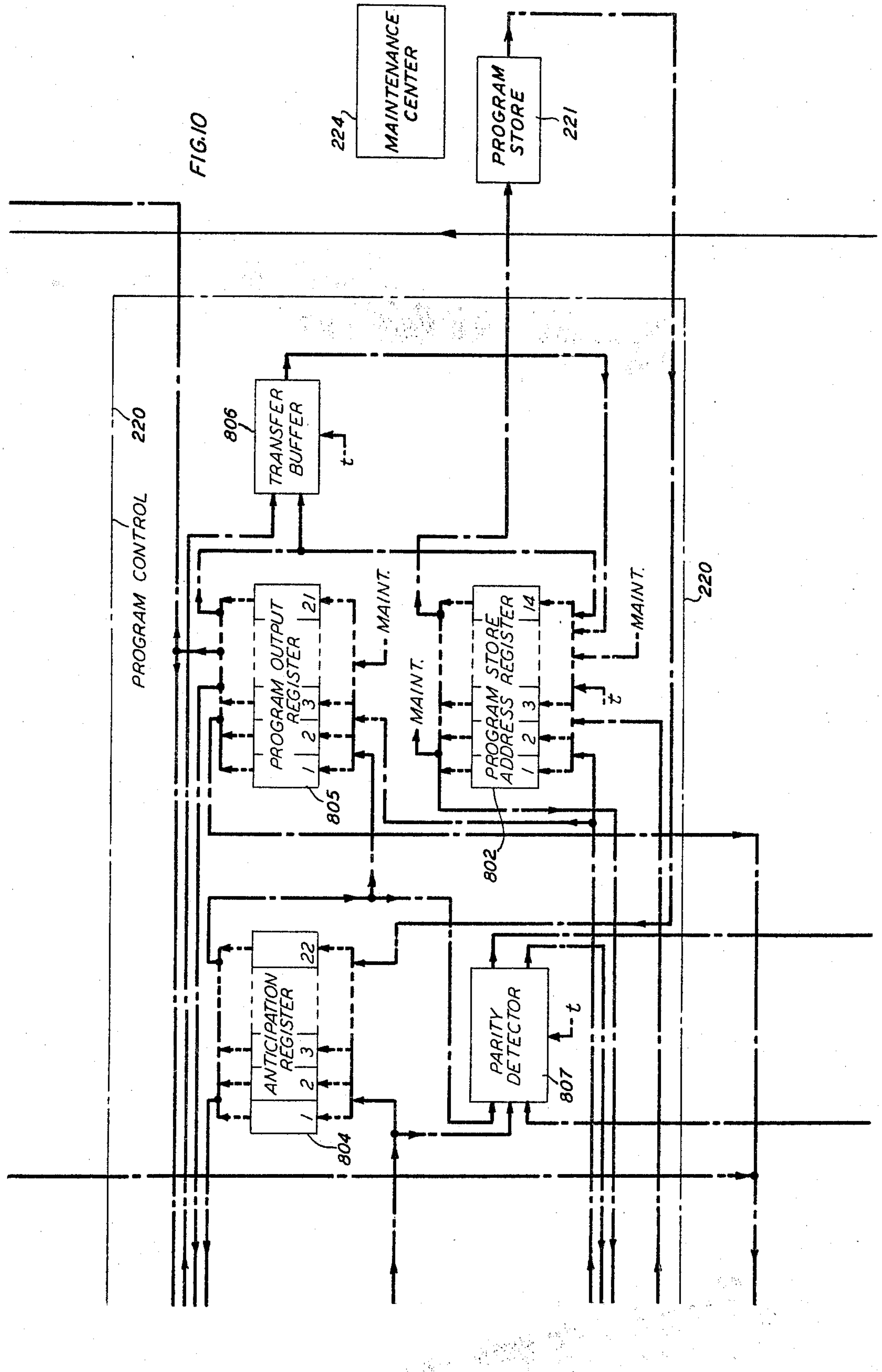

The purpose of the program control 220, FIGS. 8 through 10, is to provide and translate commands for system action. The commands are stored as individual programs in the program store 221, FIG. 10. In response to an address, as provided by the progress mark in each subsector of the call status store 501, FIG. 5, a specific corresponding program or sequence of commands will be produced by the program store 221. The program control 220 contains all of the necessary circuitry for insuring accurate translation of the commands. Its outputs are transmitted throughout the entire control unit 20, thereby implementing the actions specified by the particular program initially addressed. Thus, in this system environment, the program control 220 satisfies the actions required to advance the status of a call through the system from one state to the next.

In establishing a call connection, a prescribed sequence of events must occur prior to the actual talking connection. As indicated heretofore, each distinct state in this sequence of events bears a corresponding progress mark, each such progress mark initiating one of several alternative programs and consequent system actions dependent upon current system conditions. The particular chosen program determines the particular ensuing sequence of actions, serving to advance the status of the call from one progress mark to the next. Action is initiated upon readout of the progress mark stored in the subsector of the call status store 501 currently under observation. This progress mark is transmitted to the program store address register 802, FIG. 10, via appropriate gating circuitry in the command control logic 803, FIG. 9.

The progress mark now stored in the program store address register 802 is the first address of a sequence applied to the program store 221. Its application initiates a sequence of instructions from the store 221 which in turn result in corresponding actions, depending upon current system conditions. The program control 220 act upon these instructions so as to advance the status of the call as far as the current program will permit, at which point a new progress mark will be inserted in the currently observed subsector of the call status store 501. Thereafter, the operation is advanced to the next subsector, and its progress mark initiates another sequence of program controlled actions.

It may be seen, therefore, that the call processing section 22 is involved in the processing of a single call at a time, and it will require a number of cyclical observations of the various subsectors in the call status store 501 to finally establish the call connection as well as to disestablish a connection. Thus the program control 220 consists of a number of logic circuits including AND and OR gates and flip-flops in registers and counters, all such components being well known in the art, and which components are utilized in interrogating, interpreting and executing commands contained in the program store 221 as located by the progress mark in a given subsector of the call status store 501.

a—*Components*

The program store 221 advantageously comprises a permanent magnet twistor memory in this specific illustrative embodiment to handle the semipermanent type of storage required. Such a permanent magnet memory is disclosed, for example, in S. M. Shackell, application Serial No. 708,127, filed January 10, 1958, with the twistor used for access to the memory being shown in A. H. Bobeck application Serial No. 675,522, filed August 1, 1957, now Patent 3,083,353, issued March 26, 1963. It is essentially a random access store with sequential addressing normally provided so as to step through the typical programs in uniform fashion. At times, however, it is necessary to depart from the regular sequence of program steps and transfer to a new step or sequence of steps. In this event, an entirely new address will be provided as a starting point for a new sequence. Thereafter, the new address need only be incremented by one each time the store is read unless and until another transfer point is reached.

The output of the program store 221 is transmitted to the anticipation register 804, FIG. 10, a conventional shift register as well known in the art. The anticipation register 804 acts as a buffer, retaining the information received from the program store 221 until it is requested by the command control logic 803, FIG. 9, to transfer its content to the program output register 805, FIG. 10. Immediately thereafter, the program store 221 is instructed to deliver the next command in the program sequence currently being pursued.

The buffering action of the anticipation register 804 permits the reading of the next program command while executing the command previously inserted in the program output register 805. Such buffering, as will be evident hereinafter, reduces the time for execution of the complete sequence of program commands.

The balance of the components of the program control 220 illustrated in FIGS. 8 through 10 assists in dissemination of the program commands throughout the system in proper timing, as well as affording an opportunity for comparisons between information registered in the various control components. Thus the transfer buffer 806, FIG. 10, comprises a series of flip-flops into which information stored in the program output register 805 is gated upon command received in proper timing through the command control logic 803. It functions to store a portion of the command contained in the output register 805 which is concerned with conditional transfer operations, as discussed hereinafter, in connection with command translation. The stored information is then utilized to formulate a conditional transfer address which is applied to the program store address register 802, where it serves to transfer from a currently followed program to a new program sequence by appropriate address of the program store 221.

The parity detector 807 checks the even parity of the information contained in the anticipation register 804. If the parity is odd, an error has occurred in the transfer of the current command from the program store 221. The detector 807 must recognize this error and alert the system immediately to prevent execution of the erroneous command.

There is sufficient delay inherent in the transfer of commands between the anticipation register 804 and the program output register 805 to permit the parity detector 807 to perform its function. It comprises a multiple stage network tree of matched circuits, each matched circuit comprising AND gates with the final output, if any, stored in a flip-flop. Such parity detectors are well known in the art.

Components 802–807 act upon commands received from the program store 221 and direct these commands to other parts of the control unit 20. Other components in the program control 220 receive other system information and compare it with such commands to implement system action. These components include the incoming message buffer 810, FIG. 8, which serves to temporarily store all new inputs to the call processing section 22. Such new input information originates at the switch units and is transmitted to the control unit by means of the data or digit trunks, FIGS. 1 and 2. Such information is stored initially in the data and digit store 204 of the input-output section 21. In proper timing, such new information is gated from the store 204 to the incoming message buffer 810. It also receives information message buffer 810. It also receives information from the call status store output register 502, FIG. 5, indicating the particular subsector of the call status store 501 in which the incoming message may be stored. Thereafter, in proper timing, and upon receipt of appropriate commands from the command control logic 803 and the message transfer control 811, FIG. 8, the stored message is gated from the buffer 810 to the comparator 812 or through the call status control gating 808, FIG. 9, to the call status store output register 502. The buffer 810, FIG. 8, comprises AND gates and storage flip-flops, as well known in the art.

The message transfer control 811 controls the transfer of information between the data control 203 in the input-output section 21, and the program control 220. As indicated heretofore, the two sections of the control unit 20 are not synchronized, i.e., information is transferred between the input-output section 21 and the various switch units 10-*n* in serial form, while all transfers of information between the two sections of the control unit 20 are in parallel form. Likewise, when the call processing section 22 desires to transfer information pertaining to a particular call to a corresponding switch unit, it does so by first presenting the information in parallel form to the input-output section 21. When the program control 220 desires to transfer information to the data and digit store 204, it must first examine a counter circuit included in the message transfer control 811 to determine whether or not there is sufficient time in the current scan interval for the store 204 to perform the complete message transfer. If not, the message transfer control 811 will indicate a busy condition, and the program control 220 will await the next scan interval to store the waiting message in the proper location of the data and digit store 204.

At the start of a new sector scan in the call status store 501, a command is transmitted from the command control logic 803 to the message transfer control 811 to interrogate the data and digit store 204 for any new message from the designated switch unit. If a new input in fact exists in the data and digit store 204, it is transferred by the message transfer control 811 to the incoming message buffer 810 regardless of parity. The particular program routine in operation at the time will subsequently observe the message which contains a parity bit and will only permit subsequent action by the call processing section 22 if proper parity is indicated. The data and digit store 204 is further interrogated as to the status of the outgoing data trunk 205 assigned to the switch unit corresponding to the sector under consideration. The report on this trunk condition is stored in a busy-idle flip-flop in the message transfer control 811. Again, all of these actions are performed on the condition that there is sufficient time in the scan interval for the store 204. Otherwise, implementation of this command must await the next digit transfer interval or scan cycle of the data and digit store 204.

The command to seek out an idle outgoing data trunk 205 is also implemented by the message transfer control 811. If in fact an idle data trunk is found, the program control 220 will be advised to transfer to a new program sequence. Otherwise this command will interrupt the normal scan of the data and digit store 204, if time is still available in the scan interval, in order to update the outgoing data trunk status. In this fashion the program control is kept currently advised as to the status of the outgoing data trunks 205.

Other commands which are processed by the message transfer control 811 include transfer of a message to the data control 203, provided an idle outgoing data trunk 205 assigned to the appropriate switch unit is indicated. Due to the length of such messages, interruptions in the transfer may be required, in which event the message transfer control 811 will monitor the transfer in successive digit transfer intervals or cycles of operation of the data and digit store 204.

Upon completion of such message transfer, the message transfer control 811 is set to the busy condition and a completion signal transmitted to the command control logic 803 indicating that the current command has been carried out. A similar function is performed by the message transfer control 811 in the event that the program control 220 desires to transfer a series of digits to the input-output section 21 for outpulsing through the sender control 211. Similar to the message transfer command, if there is not sufficient time during the scanning cycle in the data and digit store 204, the message transfer control 811 will defer action on the requested digit transfer until the next scan cycle. When the interruption of the data and digit store 204 scan cycle is effected and the digits are in fact transferred, the command control logic 403 is so informed and its normal program sequence continued. Thus the message transfer control 811 comprises a series of AND gates and storage flip-flops, as well known in the art, which serve to transfer and store commands in appropriate timing.

The comparator 812, FIG. 8, as its name implies, serves to compare two numbers and to provide distinct outputs indicative of the matching or mismatching state. Conventional logic circuitry, including AND gates and inverters, are utilized for comparing the corresponding digits in each of the multiple digit binary numbers applied thereto in parallel. The commands which require the comparison of a particular telephone line designation with the content of a particular subsector in the call status store 501 will utilize the comparator 812. Upon receipt of the command, the line designation stored in the incoming message buffer 810 will be compared with the content of a particular subsector in the call status store 501 which was just entered in the call status store output register 502. If a match is encountered and proper parity exists in the incoming message designating the calling line, the comparator 812 will provide an output signal via the command control logic 803 which serves to gate the content of the call status store output register 502, concerned with the corresponding line designation, to the program store address register 802, FIG. 10. Failing to provide a match, the comparator 812 output will serve to defer the transfer action until the call status store output register 502 contains information which does in fact produce a match as it continues to scan each subsector in the call status store 501 in sequence. Failure to provide a match in the comparator 812 during the scan of an entire sector of the call status store 501 will indicate the presence of a request for service, and the end of sector scan will supervise the insertion of the calling line designation, as received in the call status store output register 502 from the incoming message buffer 810 through the call status control gating 808, FIG. 9, in an idle subsector of the call status store 501.

The input buffer 813, FIG. 8, the switch unit buffer 814, and the cell status store buffer 815 are general purpose storage units comprising AND gates and flip-flops, as well known in the art, arranged to perform various functions in conjunction with the call status store 501. Thus the switch unit buffer 814, for example, contains the number of the particular switch unit with which the call status store 501 is currently engaged. Its input is derived from the call status store output register 502, and its outputs are utilized as a reference for addressing the various stores in the input-output section 21.

The call status store address register 816, FIG. 9, is a binary counter, the content of which is ordinarily changed sequentially. Each call status store subsector comprises four words, FIG. 17, having reference to some specific operation for which it designates the status. The portion of the directive contained in the call status store address register identifies one of these four words in the subsector. The register 816 receives commands through the command control logic 803 as well as the current address of the call status store 501 as contained in the call status store output register 502, the add shift counter 504 and the call status store buffer 815 through the call status control gating 808. Upon command, the address register 816 provides the appropriate address to the call status store 501 and also applies a portion of its content to the call status store buffer 815 and to the duplicate call status store address register in the program control 220*a*.

The subsector counter 817, FIG. 9, maintains a record of the subsector in which the call status store 501 is currently active. It is enabled at the beginning of each sector scan and is informed at that time as to the number of subsectors contained in the particular sector currently being scanned. Thereafter, the call status store 501 is scanned sequentially and the subsector counter 817 is decremented by one each time a new subsector is entered. When the counter reaches two, the end of the sector scan is indicated and the distinct end of sector scan routine is initiated. The subsector counter 817 is kept currently advised as to the subsector of the call status store 501, being interrogated by information received from the call status store buffer 815 and call status store output register 502. Its outputs in turn are directed to the call status store buffer 815 and command control logic 803 to increment the sector scan and are also directed to the data control 203 in the input-output section 21 to assure that both sections of the control unit 20 are aware of the particular subsector in which the call processing section 22 is currently active.

b—*Processing commands*

Figure 15:
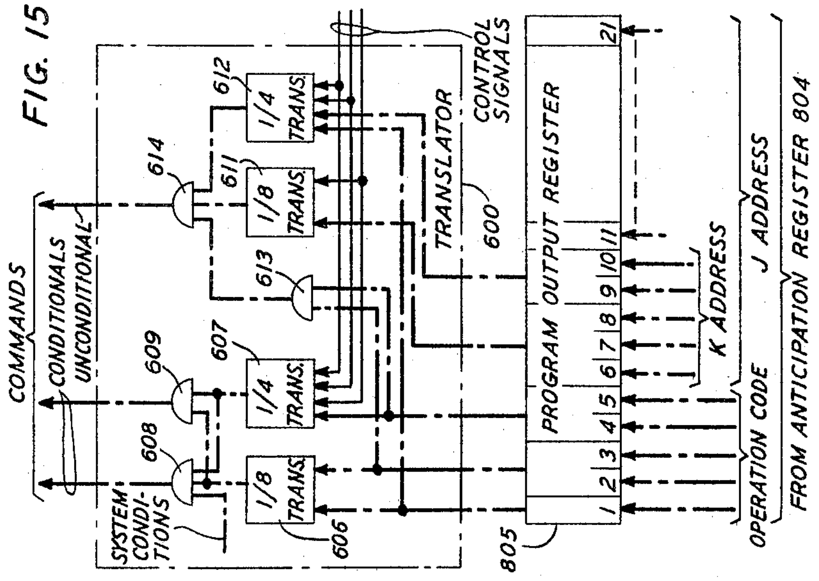

The particular manner in which the program control acts upon commands supplied by the program store 221 is determined by that portion of the command control logic which serves to translate the commands as they are received from the program output register 805. Certain system operations require a more extensive address than others. Thus the commands are divided into two types, the distinction permitting a more expeditious handling of the operations which they designate. As illustrated in FIG. 15, the long command is divided into an $m$ digit operation code and an $n$ digit address, the $n+m$ digits completely filling the program output register 805. The short command also contains an $m$ digit operation code but the $n'$ digits in its address are less than the $n$ digits required for the long command, such that $m+n'=\frac{1}{2}n+m$.

A continuous flow of commands is provided to the program translation portion of the command control logic 803. As each command is executed, the next one is received. The general sequence of action involves transfer of information from the program store 221 to the anticipation register 804 and from there to the program output register 805 upon receipt of an appropriate gating command. Regardless of whether the content of the anticipation register 804 is two short commands or one long command, the entire content is nevertheless gated to the program output register 805. If two short commands are received, the program output register 805 in conjunction with the translation portion 600 of the command control logic 803 will act upon the short command contained in the left side of the register 805. Concurrently, the program store address register 802 is advanced by one, thereby instructing the program store 221 to read the content of the next stored word into the anticipation register 804. Subsequent to execution of the first short command, the program output register 805 gates the second short command to the left or action side. After the second command has been read out and translated, the new information, viz, one long or two short commands contained in the anticipation register 804, is gated to the program output register 805.

The program translation concerns the program output register 805 and certain elements of the command control logic 803, as depicted in FIG. 15. Each command, whether the short or long type, has the same *n* digit operation code. In this specific system illustration, a 5-digit operation code is employed. Thus each operation code may define one of thirty-two possible operations. As illustrated in FIG. 15, the 5-digit operation code is divided into distinct groups. The outputs from these groups are translated in 606 and 607 and combined in AND gates 608, 609 in such a manner as to generate two types of commands: (1) Unconditional commands are utilized to perform specific tasks in the control unit such as shifting the content of a register, transferring an outgoing message, et cetera; (2) Conditional commands are formed by combining the translated information with current system conditions, thus requiring that system conditions be satisfied before execution. Such a conditional command may be to match a calling line with the content of a particular subsector in the call status store 501. This command will only be issued by the program translator 600 if particular system conditions which require such a match are present, as indicated by various components in the control unit 20.

The foregoing conditional or unconditional commands do not require translation of the address portion. However, certain commands do require such a translation. In the latter case, the appropriate translation is shown in FIG. 15 and involves translators 611 and 612. One digit of the operation code which is identical for all commands requiring address translation, serves to enable the translator 612. The four remaining digits of the operation code in those commands requiring a translation are transmitted through AND gates 613 to provide the operation codes directly. The final command, as provided by AND gates 614, thus comprises a combination of the operation code output of AND gates 613 and the address translation, as provided by translators 611 and 612.

Figure 14:
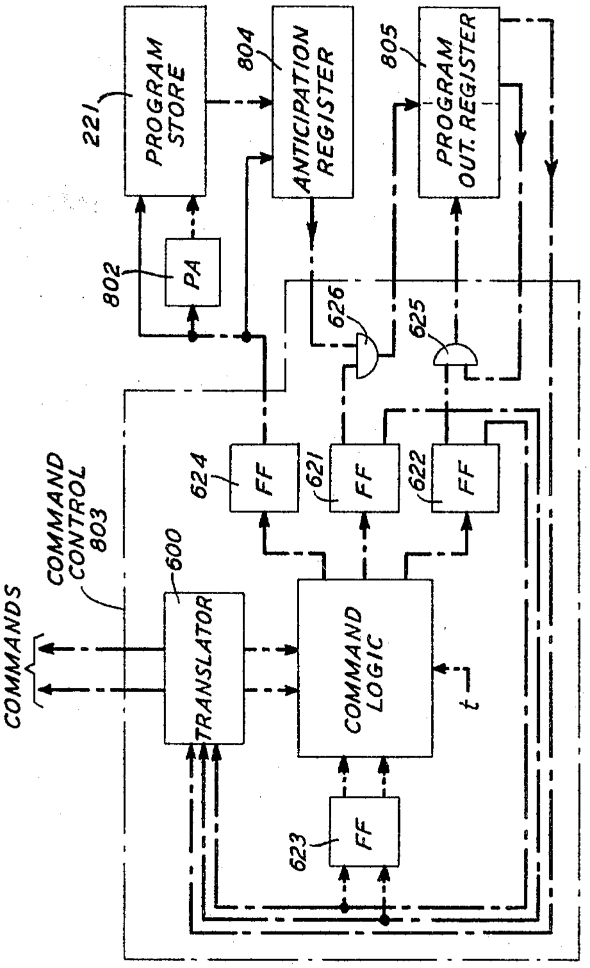
FIGS. 14 and 15 illustrate the operation of a portion of the control facility in greater detail.

In processing and executing the commands contained in the program store output register 805, there are essentially four flip-flops in the command control 803 which control the flow of information to the program translator 600, as depicted in FIG. 15. These flip-flops, as indicated in FIG. 14, are 621, 622, 623, and 624, which are normally set and reset in sequence. The setting of flip-flop 621 permits the information in the anticipation register 804 to be gated to the program output register 805. Concurrently, flip-flop 623 is set to indicate to the command control 803 that the first command has been acted upon by the translator 600.

Upon execution of the first command and presupposing that the next command is short and contained in the right half of the program output register 805, flip-flop 622 is set. It performs a function similar to flip-flop 621 except that it serves to gate the short command from the right half to the left half of the program output register 805 through gates 625. Flip-flop 623 is reset upon completion of the transfer of the command position in the program output register 805 in order to indicate that the second short command is now in position to be activated. Flip-flop 624 is normally set subsequent to the transfer of the command or commands from the anticipation register 804 to the program output register 805 so that the next command information will be stored therein and be available immediately upon execution of the commands currently in the program output register 805.

Assume, for example, that a long command is contained in the program output register 805. The output from the translator 600, in combination with appropriate timing pulses, steps the sequence of flip-flop operations leading to the insertion of the proper commands in the program output register 805. First, flip-flop 624 is set so that the read signal can be applied to the program store 221. Thereupon, the addressed information is transferred to the anticipation register 804. In order to move the new information to the program output register 805, flip-flop 621 is set, which in turn enables gates 626. The translator 600 is disabled during the gating interval by the output of flip-flop 621 which at the same time serves to reset flip-flop 623. This disabling of the translator 600 occurs after an appropriate interval required to perform the command functions. When the translator 600 is once again enabled, a new command will be awaiting execution in the program output register 805. The program store address register 802 is incremented by one. If the command currently being translated is of the short form, requiring less time for the operation, flip-flop 622 is set in adidtion to flip-flop 624 at this time.

Concurrently, the translator 600 output commands the system to perform its specific tasks and, after an appropriate interval, the read signal is again presented to the program store 221 to read the next command information. Simultaneously, the output of flip-flop 622 activates gates 625 to transfer the short command in the program output register 805 from the right side to the left side. Flip-flop 623 is reset by the output of flip-flop 622 to indicate that the second command (in this instance a short command) is now being processed.

If this command is of the conditional type and the condition is satisfied, an output is generated which calls for a transfer to a different address in the program store 221. However, an indicated, a previous readout instruction is being acted upon at this time. In order not to disturb this action, the changing of the program store address is deferred. The information previously read out of the program store 221 is discarded because such a conditional command breaks the program sequence. Thereafter, the new command information provided in response to the conditional command is gated from the anticipation register 804 to the program output register 805 by the setting of flip-flop 621, and at the same time flip-flop 623 is set to indicate that this is the command to be acted upon next in the sequence.

Thus the routines and subroutines prepared externally and loaded mutually into the program store 221 provide sequential lists of commands to meet every possible situation which might develop in a telephone system. Generally, the program store 221 is read sequentially. However, the subroutines are multipurpose and may be utilized a number of times during the processing of the same call. As a result, optimum use of the program store 221 is realized by storage of each of these subroutines at a corresponding address and having the main program transfer to that location when the subroutine is required.

Conditional transfers, as described heretofore in connection with the program translator 600, are employed in reaching decisions and occur only when certain system conditions are satisfied. Unconditional transfers to subroutines or to new locations within the currently active routine are made as the program demands.

3—*Line information control 223 (FIG. 11)*

The purpose of the line information control 223, FIG. 11, is to ascertain particular information stored therein which is significant to the establishment of certain calls. It comprises a store 901, an address register 902, and an output register 903. When a certain item of information contained in the line information store 901 is desired, a command is received from the program control 220 and placed in the address register 902. Subsequently, a command is received to read out the information at the designated address; whereupon, stored information is transmitted to the output register 903 and subsequently through the call status control gating 808 to the call status store output register 502. The control 223 is not duplicated in the system. In case of failure, the special services which it furnishes to the system will be withdrawn and only the basic telephone services will be provided.

The store 901 in this illustrative embodiment advantageously comprises a semipermanent twistor memory of the same basic type as utilized in the program store 221, while the input and output registers 902 and 903, respectively, may comprise conventional register circuitry, as well known in the art.

4—*Processing a call*

As indicated heretofore, call processing is simply the collection of new information from each of the switch units 10–*n*, comparing it with information previously stored in the call status store 501, and implementing and recording all actions dictated by the received information as it affects the current status of the call in accordance with instructions or commands received from the program store 221. The following description of a routine call through the system examines in particular the activity of the call processing section 22. For simplicity, it is assumed that all equipment required to complete the connection is idle, thus omitting special operations requiring alternate routes. However, such special operations utilize the basic equipment in a manner similar to that described in connection with the routine call.

The call begins under control of the switch unit and input-output section 21, as described earlier. When the calling line goes off-hook, the scanner 110 in the switch unit 10 recognizes the change of state and pauses in its scan long enough to transmit the line and condition identity to a data receiver 201 in the input-output section 21. The receivers, including 201, are scanned by the trunk and digit receiver scanner 401 in the data control 203 and direct the incoming message via an incoming data trunk 202 into the data and digit store 204. The store 204 has space available adequate to store four distinct messages or words for each data receiver 201. The off-hook message for the instant call is stored in the first word of the space allotted to its data receiver.

Each such storage area is interrogated in sequence by the call processing section 22. The programed logic of the call processing section 22 now supersedes the wired logic of the input-output section 21 in the subsequent control of the call processing. The call status store 501 maintains a record of the current status of every call or prospective call in the system. The program control 220 directs the sequential scan of the call status store 501, checking the current status of each call against information received in the interim, and updates the record to agree with its current or newly-established state. The call status store 501 is arranged so as to store call status information in major sectors, FIGS. 17, each sector corresponding to one of the switch units 10–*n*. The sectors in turn are divided into subsectors, with each subsector being available for storage of information pertaining to a particular call originating or terminating in the switch unit corresponding to the sector in which it is found. The sectors are scanned in sequence, the scanning of ecah sector being divided into three distinct routines designated the beginning of sector, sector scan, and end of sector.

Let us assume that the sequential scan of the call status store 501 is about to reach the sector corresponding to the switch unit in which the instant call originated. As the scan completes the end of sector routine for the previous sector, the number of the next sector to be scanned is registered in the switch unit buffer 814, FIG. 8. The program control 220 then directs the program store address register 802, FIG. 10, to address the beginning of sector routine contained in the program store 221. This routine initially serves to request any new messages such as the off-hook message for the instant call from the input-output section 21. The command for obtaining such new information clears the incoming message buffer 810, FIG. 8, directs the identity of the sector to be scanned to the address register 404 in the data control 203, thereby interrogating the data and digit store 204 for any new input from the corresponding switch unit, and places the message identifying the instant calling line as being off-hook in the incoming message buffer 810 after such message has been completely stored in the data and digit store 204.

The next command in the program clears the input buffer 813 and gates the address of the first subsector and the number of subsectors in the sector to be scanned from the program store 221 to a temporary storage location in the call status setore 501. An attempt is made to reserve a data transmitter 206 in the input-output section 21, and the success of this endeavor is recorded in busy-idle and reserved flop-flops in the message transfer control 811. We assume here that the data transmitter is available, so that the program now reserves it, together with the data trunk, and checks the parity of the message stored in the incoming message buffer 810.

The program now directs a sequence of operations to determine whether the off-hook indication just received is in fact a call origination or whether it is merely a temporary hookswitch depression or flash by the calling party, et cetera. Thus a specific portion of the call status store 501 is reserved for on-hook indications. Such indications are timed and the corresponding line designations compared with the designation of the instant calling line. The storage area is concerned with trunk and extension on-hook indications, and it first observes the trunk entries. Assuming that there is no trunk on-hook indication present which would identify the new message as involving a tie trunk, the program saves the address and transfers to a new routine to identify the calling line.

The off-hook indication stored in the incoming message buffer 810 is accompanied by a coded designation of the calling line. Such coded designations are provided in accordance with a unique classification system which informs the program control 220 as to the class of equipment that originated the off-hook indication. For example, telephone lines, test lines, trunks, maintenance points, and attendant loops are each included in a corresponding distinct group of numbers. The program gates the input message from the buffer 810 to the call status store output register 502, FIG. 5, via the call status control gating 808, FIG. 9, without clearing the incoming message buffer 810.

After testing for the presence of a new message in the output register 502, the message is shifted to the left a sufficient number of bit positions so as to bring a particular bit into the first register position. A distinct command tests this bit and finding a zero, informs the program control 220 that the number of the line providing the off-hook indication is found in a range having an upper limit less than the binary count indicated by the comparison. The program thereupon shifts the message to the right until its original position in the register 502 is achieved.

The program now requests that a comparison be made which will determine the content of two other bit positions in the register. It does so by destroying the content of all other positions in the register 502. The remaining two positions are then interrogated for the presence of a one. If either position contains a bit marked one, the calling line is identified as being greater than a specified number, while if both positions contain zeros, the calling line is less than a given number. In this general way the calling line identity is established between specified limits which, according to the classification, identify the calling line as a PBX extension rather than trunk attendant loop, et cetera.

The input buffer 813 receives and stores the information marking the calling line as a PBX extension. The program now returns to the off-hook identification sequence and this time attempts to match the number in the incoming message buffer 810 against each of the on-hook indicating numbers contained in the previously described specific portion of the call status store 501. Since this is a legitimate off-hook call origination, such a match will not be obtained. The program thereupon sets a match required flip-flop in the command control logic 803, FIG. 9, and transfers to the sector scan routine.

The sector scan routine begins by retrieval of the address of the first subsector and the total number of subsectors from the temporary storage area in the call status store 501 and the transmission thereof to the call status store address register 816, FIG. 9, and subsector counter 817, respectively. The sector scan routine will then utilize the comparator 812 to compare the number in the incoming message buffer 810 with the calling and called line designations of every subsector in the currently scanned sector, the progress mark of which requires such comparison. The subsector counter 817 is reduced by one each time the sector scan routine examines a subsector. When the sector scan routine has examined every subsector in the currently scanned sector, the subsector counter will be set at a point which will trigger the transfer of the program to the end of sector routine.

Each subsector contains a progress mark identifying the status of the call contained therein, and the sector scan routine first observes the progress mark in the subsector currently being scanned. Certain progress marks indicate that both calling and called line designations are absent from the currently scanned subsector, in which case the matching operation is skipped. Since the instant calling line will not be recorded in the subsector as the line was assumed to be inactive prior to receipt of the off-hook indication, the matching operation with the designations stored in each subsector will be unsuccessful.

After cycling through the remaining subsectors in the sector under scan, the program transfers to the end of sector routine. The end of sector routine first checks the incoming message buffer 810 and finds the instant off-hook indication of the calling line stored therein. It also checks the match required flip-flop in the command control logic 803. Since a match had not been obtained, the program examines the incoming message buffer 810 to determine the reason for the requested match and finds that the calling line has gone off-hook. Since the calling line designation was not found elsewhere in the system, the program recognizes this to be an origination and not an off-hook indication in answer to ringing.

The program now transfers to a subroutine which scans the sector to find an idle subsector. Upon locating such an idle subsector, the program transfers the calling line designation from the incoming message buffer 810 to the appropriate storage area in this idle subsector. An idle digit trunk 207, FIG. 2, and digit receiver 209 are selected and a message is sent to the switch unit via the corresponding data trunk which results in the calling line being connected to the selected digit trunk. At this point the calling party receives dial tone generated in the digit receiver 209 and transmitted through the digit trunk 207.

During the receipt of digits identifying the called line, the call status store 501 is continually scanned but no action is taken, insofar as the instant call is concerned, until all digits have been registered. A new progress mark has been placed in the subsector which contains the calling line identity, and each time the sector scan routine finds this progress mark, it tries to match the stored calling line identification with the content of the incoming message buffer 810. Failing in this endeavor, the program inquiries as to the reception of all digits identifying the called line. This inquiry is directed to the digit control 210 in the input-output section 21. The program then directs the call status store 501 to place the third word of the subsector currently being scanned in the call status store output register 502. This word contains the number of the digit receiver 209 and the number of the digit trunk 207 being used on this call. Thus when the command is transmitted to the digit control 210 to provide the complete called line information, the digit receiver identity, as contained in the call status store 501, is compared with the digit receiver number contained in a receiver number register 314 of the digit control 210. If a match is encountered, the called line information is transferred to the call status store output register 502.

Of course the process of providing the digits identifying the called line consumes an appreciable time relative to the time required for one scan of the call status store 501. Thus a considerable number of scans will be conducted prior to the realization of the foregoing information transfer operation. Subsequently, the program transfers to a routine which serves to translate the called line designation as now contained in the call status store output register 502. The called line designation is transferred to the alloted area of the subsector containing the calling line designation in the call status store 501. The program thereupon transfers to a routine which checks and releases the previously assigned digit trunk 207 and digit receiver 209.

Returning to the main routine, the program requests assignment of a data transmitter 206, FIG. 2, and commands the switch unit via the data link to break the digit trunk connection previously established. The add shift counter 504, FIG. 6, is subsequently activated by the program to place a zero in its first three stages. These are identity bits signifying that the called line is to be busy-tested. The program then, by a subroutine, places the called line designation in a special storage area of the call status store 501, containing a list of numbers awaiting busy-test, along with the address of the instant call status store subsector and the identity bits.

Returning to the main routine, a new progress mark is written in the instant subsector designating that the calling line is awaiting busy-test of the called line. After advancing through the entire scan of the call status store 501, the program again returns to the beginning of sector routine for the instant sector. One element of this routine is to observe the aforementioned list of numbers awaiting the busy-test and to put the called line designation found therein in the incoming message buffer 810. The address of the instant subsector also found in this list is placed in the call status store address register 816, thus directing the program immediately to the called line storage area of each subsector, rather than attempting a match with the calling line storage area in the normal routine.

The beginning of sector routine reserves a data transmitter 206 as its final action and then transfers to the sector scan routine. During the sector scan, an attempt is made to match the called line designation as now contained in the incoming message buffer 810 with the content of the called line storage area of each subsector. If a match is not realized during the sector scan, an idle called line is indicated. The end of sector routine, upon finding that the reason for the match was a busy-test, will read out information in the instant subsector. The identity digits are stored in the add shift counter 504, the subsector address in the call status store address register 816, and the number of subsectors in the subsector counter 817.

The content of the add shift counter 504 will indicate that busy-test has just been performed on the called line, and a call waiting check is performed therein.

In the instant situation, there was no party waiting for the called line to become idle, so that the result of this check will permit the program to advance the progress mark in the instant subsector. The new progress mark initiates routines which investigate the status of the area in the instant subsector allotted to the services of an attendant at the PBX. Since no attendant is required on this call, as is true of any normal call through the system, this area will be empty.

Having determined this status, a command is transmitted to the switch unit over the reserved data trunk, causing the calling line to be connected to ringback tone and the called line to ringing tone. The ringing code is written in a portion of the third word of the instant subsector, and the particular ringing group code required for this call, as obtained from the line information store 901, FIG. 11, is placed in a portion of the fourth word of the instant subsector.

As ringing proceeds, the program continues through its normal scanning routines.

During the end of sector routine, the program removes the data trunk reservation previously established. However, the busy-idle flip-flop in the message transfer control 811 remains in the set state established by the prior command to transmit a message over the data trunk. This condition will not be altered until the program has completed one more scan of the call status store 501 after transmittal of the message. The data trunk, therefore, tests busy and the program sets the match flip-flop in the command control 803 to its idle state.

The program advances to the beginning of sector routine for the next sector in the call status store 501. System scanning continues in the normal manner until the program returns to the beginning of sector routine for the sector containing the instant subsector. Assuming that there are no new messages from the corresponding switch unit for the beginning of sector routine to act upon, the program conducts maintenance activities and then proceeds to the sector scan. When the scan reaches the instant subsector, the program will note a progress mark stored therein corresponding to the ringing operation. Noting this condition, the program checks the match required flip-flop in the message transfer control 811. As there is no matching action required at this time, this flip-flop will record the idle state. This program then observes the ringing code and message sent portions of the instant subsector and determines from these indicators that ringing signal is being applied to the calling line.

This activity will be repeated in successive scans until ringing has been applied for one second. Time-out will occur at this point, and the program in the current scan of the instant subsector will request assignment of a data transmitter 206. If successful, the message sent indicator in the instant subsector will be activated, and the timer will be cleared. Thereupon, a message is sent to the switch unit involved in this call which causes the calling line to be connected to ringback signal and the called line to interrupted ringing.

Upon answer by the called party, the scanner at the switch unit will recognize the change to the off-hook state of the called line and transmit the off-hook message to the control unit. The processing of this new off-hook message will proceed in exactly the same manner as the off-hook origination by the calling line up to the time that the sector scan matches the new message as stored in the incoming message buffer 810 with the content of the instant subsector words allotted to the calling and called lines. The progress mark indicating ringing will be encountered as in each scan cycle prior to answer by the called line. This time, however, the match required flip-flop will be set because of the new off-hook message contained in the incoming message buffer 810. Performing the match operation, the program will discover that the content of the called line word in the instant subsector matches the called line designation contained in the off-hook message in the incoming message buffer 810. The comparator 812, in finding a match, causes the program to reset the match required flip-flop, and the program then determines the content of the message in the manner described heretofore.

The off-hook indication at this point can only be in response to ringing, so that the program will proceed to clear the call processing section 22 of the ringing routine. It also verifies that this is not a conference call and that the calling and called lines are in fact extension lines from the same PBX switch unit, and then writes the next progress mark in the instant subsector.

The new call progress mark initiates actions commensurate with actual communication between the pair of active lines. A message is sent to the switch unit which causes the calling line to the disconnected from the ringback signal, the called line to be disconnected from interrupted ringing, and finally connection of the calling line to the called line for actual communication therebetween.

During the ensuing conversation, the call processing section 22 performs the usual sequence of beginning of sector, sector scan, and end of sector routines for all sector storage areas in the call status store 501. When either calling or called party hangs up, the beginning of sector routine for the sector containing the instant subsector will recognize the on-hook message and, after determining that this on-back is not part of the receipt of a digit designating a called party, will conduct the disconnect process.

It is to be understood that the above-described arrangements are illustrative of the application of the principles of the invention. Numerous other arrangements may be devised by those skilled in the art without departing from the spirit and scope of the invention.

What is claimed is:

1. A communication system comprising a plurality of switch units each having means for independently completing connections among a distinct group of lines terminating on the corresponding switch unit and a control unit common to and remote from said plurality of switch units for recording the status of all calls through the system and for directing the interconnection of lines through said switch units, said control unit comprising a call processing section operating in accordance with a stored program to maintain a current record of the status of all calls through the system and for processing one call at a time, said control unit further comprising an input-output section connected to each of said switch units so as to transfer data between said control unit and all of said switch units concurrently and for storing data received from said switch units until requested by the call processing section.

2. A communication system in accordance with claim 1 wherein said input-output section comprises means for transferring data between said control unit and each of said switch units in serial form, and means for transferring data between said call processing section and said input-output section in parallel form.

3. A communication system comprising a plurality of switch units each terminating a distinct group of lines and a control unit common to said plurality of switch units for recording the status of all calls through the system and for directing the interconnection of lines through said switch units, said control unit comprising a call processing section operating in accordance with a stored program to maintain a current record of the status of all calls through the system and for processing one call at a time, said control unit further comprising an input-output section connection to each of said switch units so as to transfer data between said control unit and all of said switch units concurrently and for storing data received from said switch units until requested by the call processing section, said input-output section comprising means for storing and handling data in a first time cycle and said call processing section comprising means for storing and handling data in a second time cycle distinct from said first time cycle.

4. A communication system comprising a plurality of independent switch units each terminating a distinct group of lines and comprising means for effecting the interconnection of said lines, and a control unit common to and located remote from said plurality of switch units for recording the status of all calls through the system and for directing the interconnection of lines through said switch units, said control unit comprising a call processing section for processing one call at a time and having memory means for maintaining the call status record and other memory means for storing a program of operating routines to be followed selectively by the call processing section, a section for receiving data concurrently from each of said switch units and having memory means for storing the received data in distinct storage areas allocated to each switch unit, and means for transferring data between said two sections of said control unit under the direction of the program stored in said call processing section.

5. A telephone system comprising a plurality of independent private branch exchanges each terminating a distinct group of telephone lines and a control unit common to said plurality of private branch exchanges for performing the majority of the control functions necessary to the interconnection of lines in the switching networks of the private branch exchanges, said control unit comprising an input-output section arranged to exchange data concurrently with each of said private branch exchanges and having memory means for storing the received data temporarily in distinct storage areas allocated to each private branch exchange, and means for scanning said data storage areas in a first repetitive time cycle, said control unit further comprising a call processing section having memory means for maintaining a record of the status of each current and prospective call through the system in distinct areas allocated to each private branch exchange, and means for scanning said call status storage areas in a second repetitive time cycle distinct from said first time cycle.

6. A telephone system in accordance with claim 5 and further comprising means for interrupting the scanning of said data storage areas in said input-output section memory means at any point in the first time cycle to extract data for use in the call processing section and to enter data from the call processing section for subsequent transfer to a private branch exchange.

7. A telephone system in accordance with claim 6 wherein said input-output section comprises means for delaying the operation of said interrupting means until the succeeding time cycle upon determining that there is insufficient time in the current first time cycle to complete the data transfer operation.

8. A telephone system in accordance with claim 5 wherein said input-output section comprises means for controlling the storage and transfer of data concerning specific line conditions in each private branch exchange and digit control means for controlling the storage and transfer of digits designating called lines, said distinct areas in said memory means allocated to each private branch exchange being arranged to store said data and said digits in separate sections, said digit storage areas being scanned in the first portion of said first time cycle followed by the scan of all of the data storage areas in sequence.

9. A telephone system in accordance with claim 8 wherein said input-output section comprises a plurality of digit receivers available for selective assignment to any one of said private branch exchanges desiring to transmit a called line designation and wherein said digit control means comprises means for designating distinct groups of said digit receivers to be scanned in each of said first time cycles, and means for synchronizing the scan of a digit receiver with the scan of the corresponding digit and storage areas in said memory means.

10. A telephone system in accordance with claim 8 wherein said digit control means comprises means for translating the first received digit of a called line designation to determine its origination from a tone source or a rotary dial source, and means for converting the received digits to a form appropriate for storage in said memory means.

11. A telephone system in accordance with claim 8 wherein said light digit control means comprises means for determining from the first received digit of a called line designation the number of digits to be received prior to transfer of the called line designation to the call processing section, and means activated upon storage of the predetermined number of digits in said memory means to implement said transfer.

12. A telephone system in accordance with claim 11 and further comprising a plurality of trunks connecting said control unit to each of said private branch exchanges and to other telephone offices and wherein said input-output section comprises means for connecting said call processing section to one of said trunks for outpulsing a called line designation which is provided at least in part by said call processing section in response to an indication from said digit control means of the receipt of an abbreviated called line designation from a calling line through one of said private branch exchanges.

13. A communication system comprising a plurality of lines and trunks, a switching network for interconnecting said lines and trunks to establish call communications in said system and a control unit for determining the operation of said switching network, said control unit comprising an active call status store containing complete information pertaining to the status of all calls through the system, an active program store connected to said active call status store for providing system operating routines as designated by the status of each call, a standby call status store containing incomplete information pertaining to the status of all calls through the system, a standby program store connected to said standby call status store containing a duplicate of the information in said active program store, means for detecting a failure in said active program store and for automatically switching the active operation of the system to said standby program store, and means operative thereafter for interchanging all of the information contained in said active and standby call status stores.

14. A telephone system comprising a plurality of independent switch units each terminating a distinct group of telephone lines and a control unit common to said plurality of switch units for determining the operation of said switch units, said control unit comprising means for processing one call at a time and having active storage means containing the complete status of all calls through the system, standby storage means containing a partial status of all calls through the system, duplicate program stores each connected to a corresponding one of said active and standby storage means, means responsive to the detection of a failure in said active storage means to automatically switch the operation to the duplicate program store and to interchange the information stored in said active and standby storage means and means responsive to the detection of a failure in said active storage means to inhibit said interchange of information.

15. A communication system comprising a plurality of switch units each having means for independently completing connections among a distinct group of telephone lines terminating on the corresponding switch unit, and a control unit common to and remote from said plurality of switch units and including an input-output section for receiving data concurrently from each of said switch units and a call processing section for recording the status of all calls through the system and for processing one call at a time, said call processing section comprising a call status store arranged in distinct sectors corresponding to said switch units, each of said sectors being divided into a plurality of subsectors containing individual call status information, the number of subsectors per sector being determined by the exepected traffic in the corresponding switch unit, means for scanning the subsectors in sequence, means for determining the presence of new data from a switch unit as recorded in the input-output section prior to scanning the sector corresponding to said switch unit, means operative during the sector scan for comparing said new data with the data stored in each subsector of the sector under scan, and means operative upon completion of the sector scan if a comparison was not indicated for assigning an idle subsector in the scan subsector to the call indicated by said new data.

16. A communication system comprising a plurality of switch units each terminating a distinct group of telephone lines and a control unit common to said plurality of switch units, said control unit including an input-output section for receiving data concurrently from each of said switch units and a call processing section for recording the status of all calls through the system and for processing one call at a time, said call processing section comprising a call status store arranged in distinct sectors corresponding to said switch units, each of said sectors being divided into a plurality of subsectors containing individual call status information, the number of subsectors per sector being determined by the expected traffic in the corresponding switch unit, means for scanning the subsectors in sequence, means for determining the presence of new data from a switch unit as recorded in the input-output section prior to scanning the sector corresponding to said switch unit, means operative during the sector scan for comparing said new data with the data stored in each subsector of the sector under scan, and means operative upon completion of the sector scan if a comparison was not indicated for assigning an idle subsector in the scan subsector to the call indicated by said new data, said call processing section further comprising register means, means operative during the sector scan for transferring the content of a subsector to said register means, a program store, means responsive to a call status indication in the transferred content for addressing a particular location in said program store, and means responsive to each instruction in the selected program for addressing the location in the program store of the succeeding instruction in the selected program, said selected program being executed in its entirety prior to advancing the sector scan to the next subsector.

17. A communication system in accordance with claim 16 wherein said call processing section further comprises means for determining whether said instructions are conditional or unconditional, said conditional instructions being executed if the corresponding system condition is satisfied, and means for transferring to an address of a location in the program store other than the normally designated address of the succeeding instruction in the selected program if the particular system condition is not satisfied.

18. A communication system comprising a plurality of remote switch units each terminating a distinct group of lines, a ringing signal source in each of said switch units and a control unit common to and remote from said plurality of switch units, said control unit comprising a tone signal source, means responsive to a calling line indication from a switch unit for connecting said calling line to said tone signal source in order to alert said calling line to transmit a called line designation to said control unit, and means responsive to the processing of the received called line designation for enabling the switch units terminating said calling and called lines to connect said calling and called lines to the corresponding ringing signal source.

19. A telephone system comprising a plurality of switch units each having means for independently completing connections among a distinct group of telephone lines terminating on the corresponding switch unit and a control unit common to and remote from said plurality of switch units for maintaining a record of the current status of all calls through the system and for directing the interconnection of lines through said switch units, said control unit comprising a call status store containing information storage areas arranged in distinct sectors corresponding to said switch units, each of said sectors containing a plurality of subsectors for storing information pertinent to the status of a single call originated in the corresponding switch unit, means for scanning the subsectors in a given sector in sequence, means operative prior to the scan of said given sector for determining the presence in said control unit of new information from the switch unit corresponding to said given sector, and means operative upon completion of said given sector scan for assigning new call originations to idle subsectors in said given sector.

20. A telephone system comprising a plurality of switch units each terminating a distinct group of telephone lines and a control unit common to said plurality of switch units for maintaining a record of the current status of all calls through the system and for directing the interconnection of lines through said switch units, said control unit comprising a call status store containing information storage areas arranged in distinct sectors corresponding to said switch units, each of said sectors containing a plurality of subsectors for storing information pertinent to the status of a single call originated in the corresponding switch unit, means for scanning the subsectors in a given sector in sequence, means operative prior to the scan of said given sector for determining the presence in said control unit of new information from the switch unit corresponding to said given sector, and means operative upon completion of said given sector scan for assigning new call originations to idle subsectors in said given sector, said control unit further comprising means operative prior to said given sector scan for translating said new information into a calling line designation and means operative during said given sector scan for comparing said calling line designation with the line designations contained in each of said subsectors.

21. A telephone system in accordance with claim 20 wherein said control unit comprises means for receiving digits from the calling line designating a called line and means operative upon completion of said given sector scan for assigning said digit receiving means to said calling line and directing said corresponding switch unit to connect said calling line to said digit receiving means.

22. A communication system comprising a common control unit directing the interconnection of selected pairs of communicating lines terminated on a plurality of switch units located remote from said control unit and having means for independently establishing said interconnections, said control unit comprising an input-output section connected to each of said remote units so as to transfer data between said control unit and a plurality of said remote units concurrently and a call processing section connected to said input-output section so as to permit the transfer of data between said input-output section and said call processing section in parallel form, said call processing section comprising a program store containing a program of commands for the performance of system operations in a predetermined sequence, a call status store containing information indicating the current status of all calls through the system, means for registering information taken from said call status store and means for transferring the registered data to other locations in the control unit during the processing of a call according to the commands from said program store.

23. A communication system comprising a common control unit directing the interconnection of selected pairs of communicating lines terminated on a plurality of remote units, said control unit comprising an input-output section connected to each of said remote units so as to transfer data between said control unit and a plurality of said remote units concurrently and a call processing section connected so as to permit the transfer of data between said input-output section and said call processing section in parallel form, said call processing section comprising a program store containing a program of commands for the performance of system operations in a predetermined sequence, a call status store containing information indicating the current status of all calls through the system, means for registering information taken from said call status store and means for transferring the registered data to other locations in the control unit during the processing of a call according to the commands from said program store, said call status store comprising a plurality of information storage areas arranged to store the call status information in sectors corresponding to said remote units and in subsectors within each sector, said subsectors accommodating information pertaining to each call originated in the corresponding remote unit.

24. A communication system in accordance with claim 23 wherein said call processing section comprises means for scanning the subsectors of a given sector in sequence, means for ascertaining from said input-output section the presence of a new message from the remote unit corresponding to said given sector, means operative during the scan of the subsectors in said given sector for comparing a new message with the information contained in each subsector and means operative upon completion of the sector scan absent such a comparison for assigning an idle subsector in said given sector to the call indicated by said new message.

25. A communication system according to claim 24 wherein the information contained in each active subsector includes a call progress mark, said call processing section further comprising means responsive to the presence of said call progress mark from a given subsector in said register means during a sector scan for interrogating a discrete location in said program store to initiate a corresponding sequence of commands, and means operative upon completion of said sequence of commands for inserting a new call progress mark in said given subsector and proceeding to the scan of the next subsector in the sector under scan.

26. A communication system in accordance with claim 24 wherein said subsectors are arranged to acommodate a plurality of messages, said call processing section further comprising means for interrogating the message storage areas of a given subsector in sequence during a sector scan and means operative upon detection of a particular message in a corresponding subsector message storage area to depart from the regular scan sequence.

27. A communication system in accordance with claim 23 wherein said program store comprises a plurality of information storage areas arranged to store multi-element commands at discrete address locations, each command comprising an operation portion containing a uniform number of elements and an address portion containing a variable number of elements, said call processing section further comprising means for addressing the location of a given command in said program store, means for registering said given command upon removal from said program store in response to the address, means for translating the registered given command and means responsive to said translating means for addressing the location of another command in said program store.

28. A communication system according to claim 27 wherein said registering means comprises an anticipation register for receiving commands from the program store and an output register capable of registering two short commands each containing a first number of address elements or one long command containing a second number of address elements greater than said first number of elements, means for transferring two short commands simultaneously from said anticipation register to said output register, means for transferring said short commands in sequence to said translating means for said output register, and means operative upon transfer of the first short command from said output register to shift the second short command into the position previously occupied by said first short command in said output register.

29. A communication system in accordance with claim 23 wherein said control unit further comprises a line information store containing information pertinent to the establishment of certain types of calls and means operative in response to commands from said program store for transferring information from said line information store to said information registering means.

30. A communication system comprising a common control unit directing the interconnection of selected pairs of lines terminating on a plurality of remote units, said control unit comprising a call processing section operating in accordance with a stored program to record the current status of all calls through the system and to update the satus of one call at a time and an input-output section connected to each of said remote units, said input-output section comprising storage means, means for controlling the transfer of data in the form of multi-element messages between said storage means and all of said remote units, the elements of each message being transferred in sequence and messages involving a plurality of remote units being transferred concurrently, and means for transferring all of the elements of one of said messages simultaneously between said storage means and said call processing section.

31. A communication system in accordance with claim 30 wherein said input-output section further comprises a plurality of digit trunks each connected to a corresponding remote unit, a plurality of digit receivers, means for connecting a selected one of said digit receivers to an active one of said digit trunks to receive a called line designation from the corresponding remote unit, means for scanning said digit receivers and corresponding digit storage areas in said storage means in synchronism, and means for transferring digit information from one of said digit receivers to the corresponding digit storage area in said storage means.

32. A communication system in accordance with claim 31 wherein said digits each comprise a plurality of elements which are received and transferred to said storage means in serial form, means for interleaving the digit elements transferred from one digit receiver with elements of digits transferred from other digit receivers, and means for transferring the elements of a complete digit from said storage means to said call processing section in parallel form.

33. A communication system in accordance with claim 32 wherein said input-output section further comprises means for analyzing the received signals representing the first digit of the called line designation to determine the origin at a rotary dial of multifrequency tone source in the calling line, and means for converting said received signals to a common form prior to transfer to said storage means.

34. A communication system in accordance with claim 32 wherein said input-output section further comprises means for analyzing the received signals representing the first digit of the called line designation to determine the particular remote unit terminating the called line, and means activated by said analyzing means for effecting a transfer of digits to said call processing section subsequent to the storage of a predetermined number of digits received from the calling line in said storage means.

35. A communication system in accordance with claim 31 wherein said digit receivers each contain a tone source, means for connecting said tone source to the calling line upon connection of the digit receiver to the corresponding digit trunk, and means for disconnecting said tone source upon receipt of the first element of the called line designation in said digit receiver.

36. A communication system in accordance with claim 30 wherein said storage means comprises information storage ears arranged in distinct data and digit sections, means for scanning the digit storage ears in said digit section in sequence, followed by the scanning of the data storage areas in said data section, and means operative under control of said call processing section at any time during the repetitive scan of said storage means to interrupt the scan and to direct the address of said storage means to a particular one of said digit and data storage areas.

37. A communication system in accordance with claim 30 and further comprising means for controlling the transfer of called line designations to the proper ones of said plurality of remote units terminating the called line, a plurality of trunks, and means controlled by said call processing section for activating said last-mentioned means to extract the called line designation from said storage means and to outpulse said called line designation over one of said plurality of trunks.

References Cited by the Examiner

UNITED STATES PATENTS

| | | | |
|---|---|---|---|
| 2,995,165 | 10/1960 | Budlong et al. | 179—18 |
| 3,113,183 | 12/1963 | Townsend | 179—18 |
| 3,206,553 | 9/1965 | Lucas et al. | 179—18 |

KATHLEEN H. CLAFFY, *Primary Examiner.*

ROBERT H. ROSE, *Examiner.*

L. A. WRIGHT, *Assistant Examiner.*